United States Patent [19]

Clark et al.

[11] 3,725,864

[45] Apr. 3, 1973

[54] INPUT/OUTPUT CONTROL

[75] Inventors: William A. Clark, Boulder, Colo.; Kent A. Salmond, Los Gatos, Calif.; Thomas S. Stafford, Dunwoody, Ga.

[73] Assignee: International Business Machines Corporation, Armonk, N.Y.

[22] Filed: Mar. 3, 1971

[21] Appl. No.: 120,563

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,413,609 | 11/1968 | Boyle et al | 340/172.5 |
| 3,475,730 | 10/1969 | Figueroa et al | 340/172.5 |
| 3,479,647 | 11/1969 | Cohen et al. | 340/172.5 |
| 3,559,187 | 1/1971 | Figueroa et al | 340/172.5 |
| 3,573,741 | 4/1971 | Gavril | 340/172.5 |
| 3,588,831 | 6/1971 | Figueroa et al | 340/172.5 |
| 3,614,742 | 10/1971 | Watson et al | 340/172.5 |
| 3,614,745 | 10/1971 | Podvin et al | 340/172.5 |
| 3,437,998 | 4/1969 | Bennett et al. | 340/172.5 |
| 3,439,340 | 4/1969 | Gallaher | 340/172.5 |
| 3,449,722 | 6/1969 | Tucker | 340/172.5 |

*Primary Examiner*—Gereth D. Shaw
*Attorney*—Hanifin and Jancin and Owen L. Lamb

[57] ABSTRACT

An input/output control system for a data processor which controls the transfer of data from I/O devices (such as disks or drums in which data are recorded in fixed sector lengths and in which the devices are capable of signalling when they reach any desired sector).

A plurality of channels for scheduling and executing input/output programs are provided, each capable of being logically connected to a device through a crosspoint switch. I/O tasks are placed in a queue common to the channels. Channels extract tasks from the queue and execute channel programs associated with the tasks. During latent periods of devices channel programs corresponding to the devices are queued in device queues. This frees a channel to go on to another task. When a device is at a point where its program can be continued, any free channel which has access to the device responds, re-enters the program by extracting it from the device queue, and resumes execution of the program.

54 Claims, 15 Drawing Figures

INVENTORS
WILLIAM A CLARK IV
KENT A SALMOND
THOMAS S STAFFORD

BY Owen Lamb
ATTORNEY

FIG. 6
INTERRUPTION QUEUE
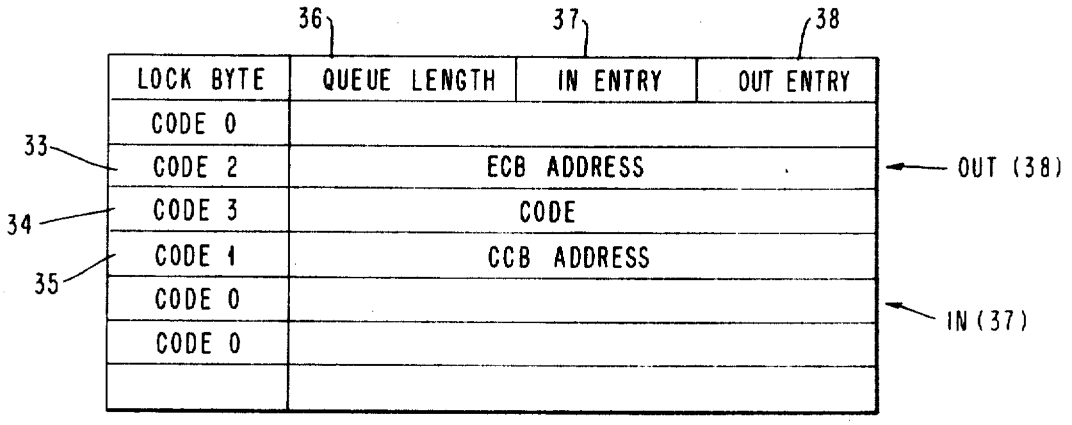
DATA SET '5' FIG. 7
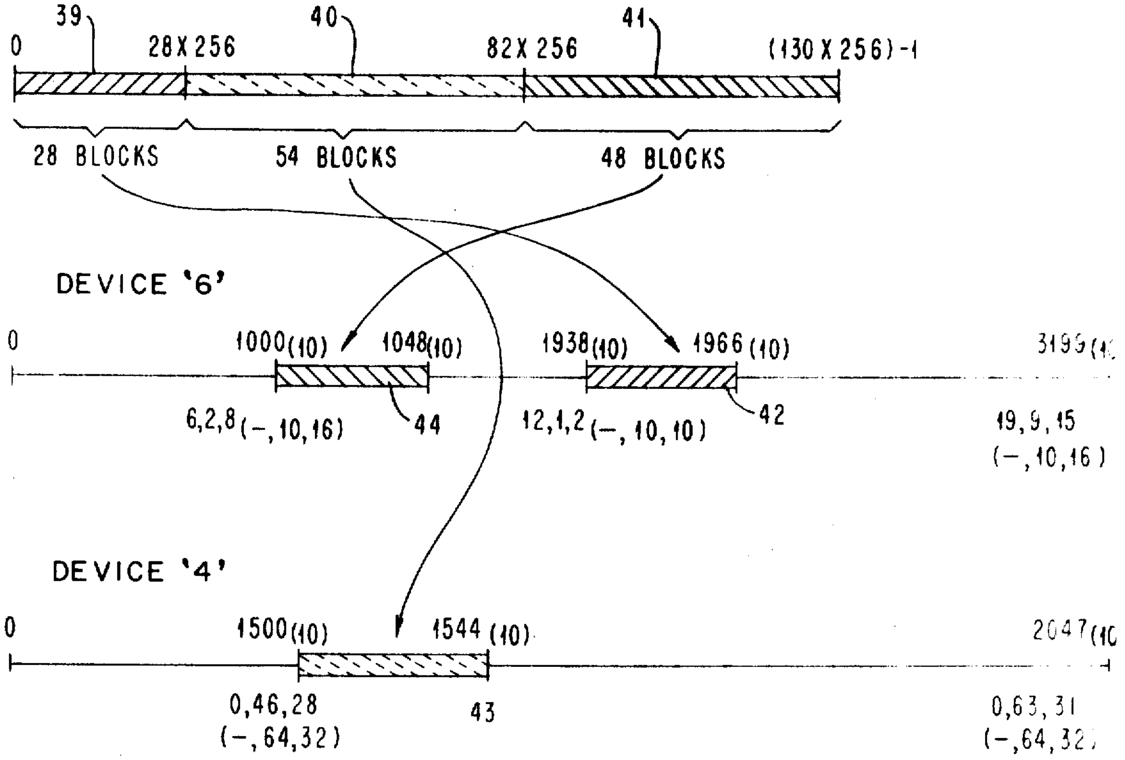

| COMMAND | ARGUMENT 1 | ARGUMENT 2 |
|---|---|---|
| ENQUEUE | R2 = INDEPENDENT ARG | R3 = DEPENDENT ARG |
| READ (OR WRITE) | R4 = BUFFER ADDRESS | R5 = RECORD LENGTH |
| BRANCH | IF BRANCH CODE = 3 | TO ENQUEUE CMD |
| | | |

REQUEST CHANNEL INSTRUCTION EXECUTION (CPU)

FIG. 13 CHANNEL PROGRAM EXECUTION
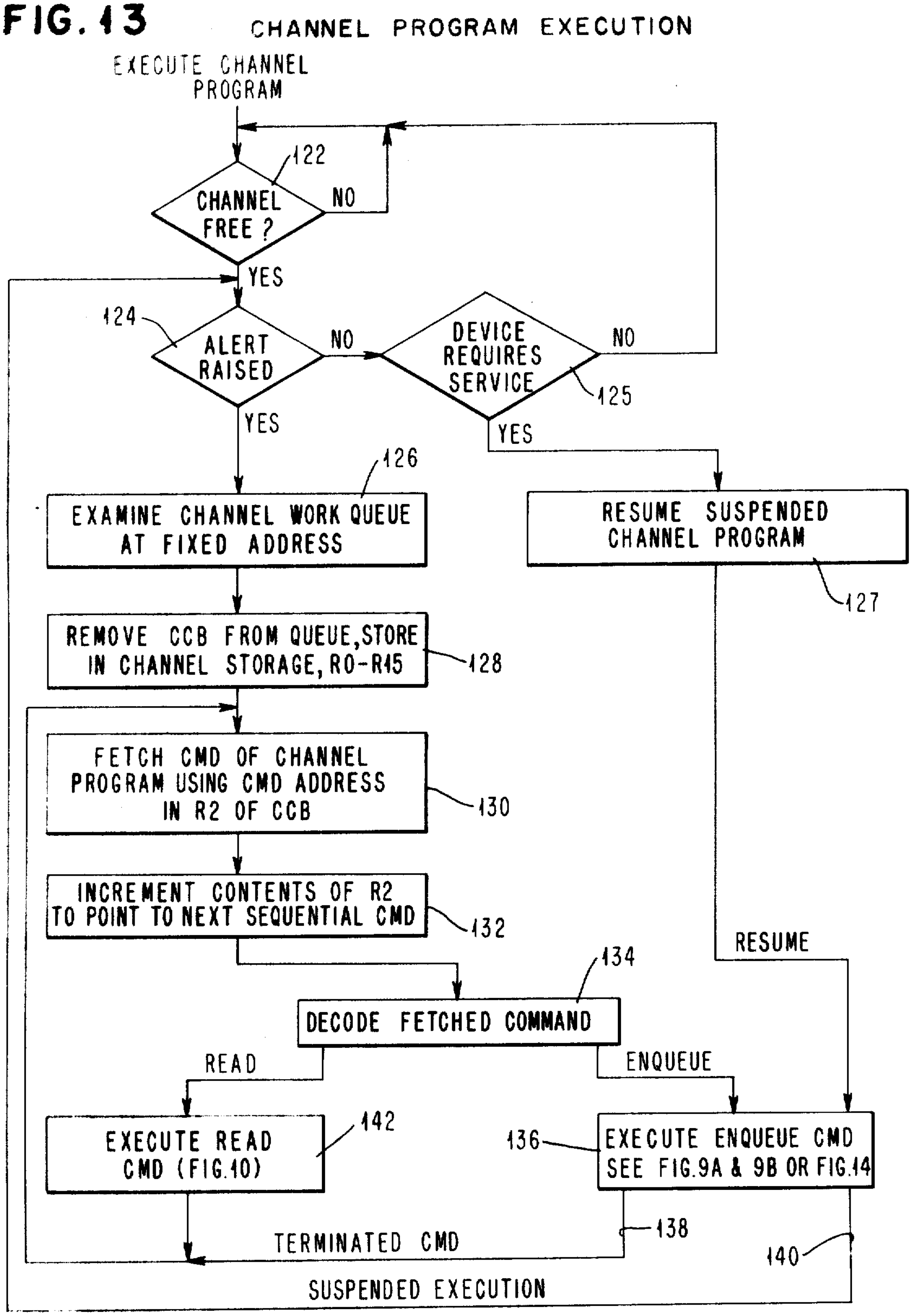

FIG. 14 ENQUEUE COMMAND EXECUTION (SIMPLIFIED VERSION)
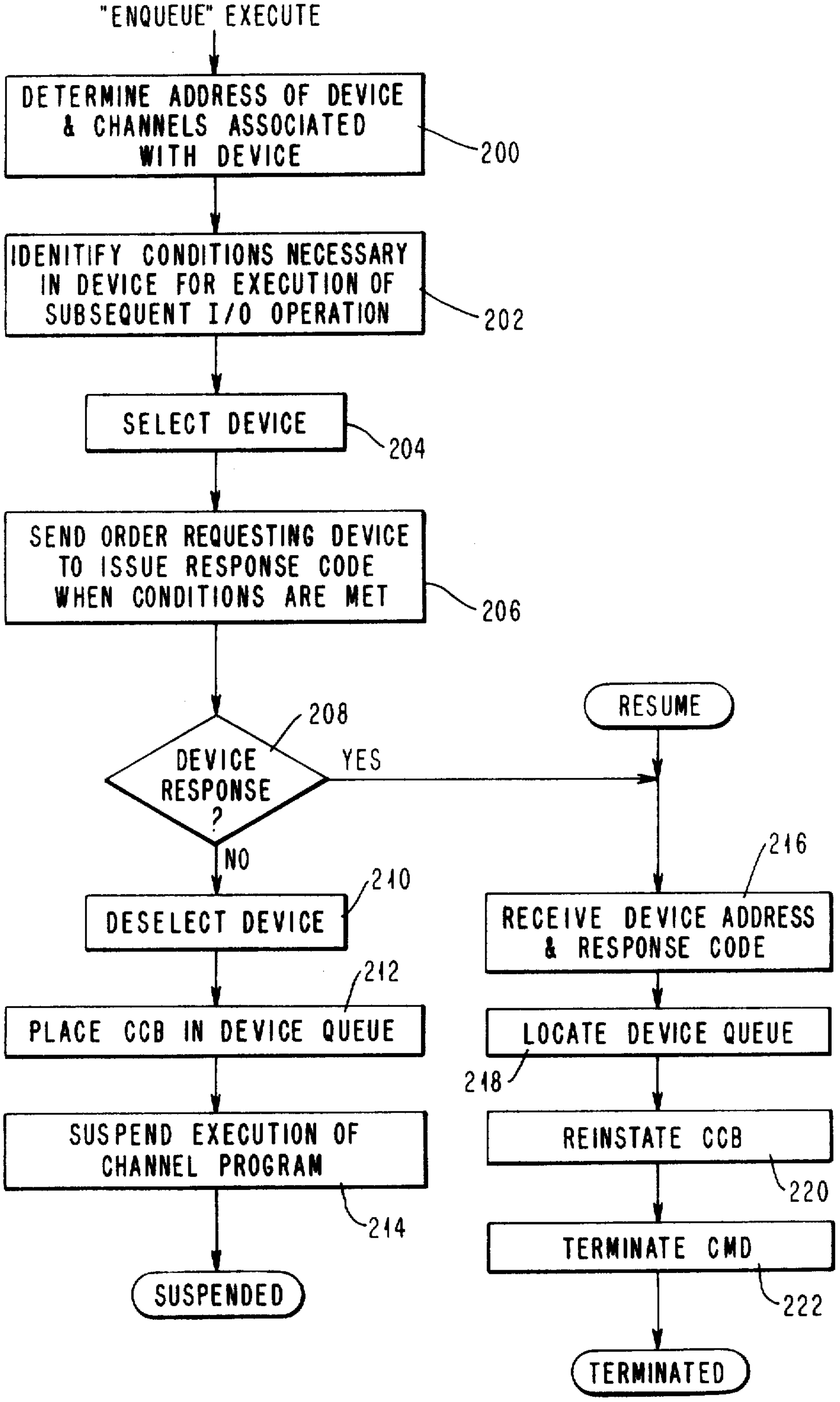

INPUT/OUTPUT CONTROL

BACKGROUND OF THE INVENTION

The invention relates to the control of input/output devices in a data processing system and more particularly to the control of data transfers between I/O devices and a computer memory.

Modern computer systems include data channels which control the movement of data between input/output devices and main storage. Channels relieve the central processing unit (CPU) of directly controlling the I/O devices and permit data processing to proceed concurrently with input/output operations. The data channels control the simultaneous exchange of data between many input/output devices and a common shared storage.

Each data channel is initialized by an instruction issued the central processing unit. The instruction causes a control word and a device address to be transferred from main storage to storage registers in the data channel. The data channel interprets the control word to start an input/output operation. The input/output operation is continued automatically by the channel which has means for fetching subsequent control words from storage independently of the central processing unit.

The first of such data channels is disclosed in copending U.S. Patent application Ser. No. 705,447 entitled "Data Synchronizer" by Christiansen, Kanter and Monroe, filed Dec. 26, 1957.

The central processor referred to within this specification is more fully described in the publication "IBM System/360 Principles of Operation," Form A22-6821, and also described in U. S. Pat. No. 3,226,689, Amdahl et al. The central processing unit (CPU) initiates input/output operations by means of a start I/O instruction. This instruction addresses a particular channel and a particular device. In response to the instruction, the channel fetches a channel address word (CAW) from a fixed location in main storage. The CAW contains the indirect address of the first channel command word (CCW) which is a control word specifying the type of command to be executed and the storage buffer area. The channel program comprises a series of CCWs which are utilized by the channel to direct the input/output operation. One CCW may control a block of information to be stored in a contiguous storage area. If several blocks of information are to be stored in different areas, a list of CCWs is used, designating storage area blocks which are chained together by chaining the CCWs.

Once a channel has been selected to perform a particular chaining operation, the channel is dedicated to that operation until it is completed. Therefore, the channel remains connected to the device even though there may be long latent periods between blocks of data specified by the CCWs in the chain.

The sequential order in which requests are made for data recorded on a rotating device may bear no relationship to the actual angular position of the device. It may take a complete revolution or a part of a revolution of the device before the desired address is in a position to be acted upon. Prior apparatuses reduce latent periods by a technique known as sector queuing. All tracks on the rotating device are divided into a plurality of fixed-length data blocks called sectors. A number of information transfer request lists are assembled in queues, one for each sector. When a request is received, it is placed in the list or queue associated with the sector at which the information transfer is to begin. Enqueuing of storage requests allows the time required for rotation to a newly specified record to be used for servicing of earlier enqueued requests directed to sectors which are already available. As sectors become available, they may contain data which is directed to a CCW which is not now stored in the channel. Since the channel must remain connected to its device until the entire chaining operation is complete, programs not currently in the channel must wait until current programs are completed. The sector queuing technique cannot be utilized to best advantage unless the channel programs are duplicated in duplicate hardware. This is expensive and requires one channel for each channel program currently in progress.

As an example of the prior art, a series of similar channels are provided and the rotating devices are equipped with position sensing which signals the approach of desired records. The channel services attached devices on a demand basis, transmitting an entire record upon each selection.

Several devices are set in motion to search for desired records. The channel then scans each device looking for the presence of a record ready signal which specifies that the desired record is approaching the read head. When the scanning device locates a record ready signal, the corresponding device is connected to the channel and the record is read. This system saves time by simultaneously searching for records but requires an interrupt at the end of a data block so that the CPU can re-instruct the channel, i.e., supply a new control word. Furthermore, the other devices must wait until the channel is free even though the records which are being sought on the other devices are available for reading.

Other prior art devices store I/O requests in an associative memory. A record ready signal is provided for signalling the approach of a record in each rotating device in advance of the availability of the record. The address of a record becoming available on the rotating device is matched against a list of requests from the data processor stored in the associative memory and access is given to the request which matches the available address. This system is capable of automatically servicing the requests as locations become available rather than in the order in which they are received, however, it requires additional hardware for each device.

The same result is obtained by other prior devices by forming sector queues. A number of information transfer request lists are formed each associated with a corresponding one of the storage sectors. When an information request is received, it is placed in the queue associated with the sector to which the request is directed. Thus, a plurality of queues exist and as each sector approaches, a request from the queue is processed.

These apparatuses have the advantage that requests are arranged in the order in which information becomes available but still requires that the controls be logically connected whether the approaching sector has an outstanding request or not. It is not possible for more than one data transfer to be accomplished at a time without completely duplicating the control apparatus for each device because the control apparatus for a selected device must remain connected to that device until all sectors have been serviced and the queue has been depleted.

In summary, while the prior art devices have been able to substantially reduce the latent periods of rotating devices, by utilizing sector queuing, they have no means for utilizing unavoidable latent periods between sequences of data blocks for useful data handling operations. Furthermore, the prior art has provided no means for the reassignment of a channel program from one channel to another, or from one device to another.

BRIEF SUMMARY OF THE INVENTION

It is an object of this invention to provide an improved input/output control system.

Is an object of this invention to provide an improved input/output control system in which execution of an input/output program is initiated by an unprivileged instruction in a CPU program.

It is an object of this invention to provide an improved input/output control system for controlling direct access storage devices.

It is an object of this invention to provide an input/output control system in which data path selection to devices is accomplished automatically without the need for a control program.

It is an object of this invention to provide a mechanism for automatic authority protection among components of an input/output system such that channel programs initiated by a CPU program invoke only those components, or actions with respect to components, which are implied by said mechanism.

It is an object of this invention to provide an input/output control system in which fixed-length blocks are transferred from a direct access storage device to a main memory on a time-division multiplex basis.

It is an object of this invention to provide an input/output control system utilizing improved method and means of describing device-dependent requirements.

An object of this invention is to provide an input/output control system in which a non-busy data channel can select an I/O task to be performed by the channel, from a work queue of tasks to be performed.

It is an object of this invention to provide a control system for scheduling, entering, disconnecting and reentering overlapped I/O programs without interrupting or being reinstructed by the CPU.

It is an object of this invention to provide an input/output control system having a virtual storage which is byte addressable.

It is a further object of this invention to provide an input/output control system in which data in fixed length blocks is multiplexed but which has the ability to read data beginning anywhere within a block.

A further object of this invention is to provide an input/output control system which reduces the interruption rate of the central processor.

A further object of the invention is to provide an intelligent input/output system which avoids the use of the central processor to relate successive input/output operations addressed to one or more devices to thus result in a reduced input/output interruption frequency.

It is a further object of this invention to provide an input/output control system which provides for scheduling and queue maintenance of input/output programs.

It is a further object of this invention to provide an input/output controller which has the ability to reinstruct itself or another controller within the system.

It is an object of this invention to provide an improved data processing system in which a user of the system may reference a very large data set without regard to physical device characteristics or location of the data in the system.

An object of this invention is to provide an input/output system in which execution of a single channel program is automatically carried out on a number of channels when the I/O devices involved in the I/O operation are not connected to a single channel.

It is a further object of this invention to provide an input/output control system which has the ability to suspend execution of an I/O program until a requested response from a device is received so that during the period of suspension the control system may be used to perform input/output operations under the control of other I/O programs.

A further object of this invention is to provide an input/output control system having a command format which permits the coding of reenterable, address-free and parameter-free channel programs and to provide location independent addressability to such channel programs.

Briefly, the invention comprises an input/output control system which includes controls which select an I/O task from a queue of tasks whenever the controls are free. The controls perform the task, which is in the form of an I/O program, up to the point where the controlled I/O device involved in the task does not need direct control for a relatively long period of time (or cannot be controlled until a data path connection to the device can be made). The controls temporarily store the partially performed task in a queue for the device, select another task from the task queue, and execute the I/O program associated with the new task. When the device reaches a point where it needs control, it signals the controls, which, if available, respond and fetch the partially performed task from the device queue and resume the previously suspended I/O program.

In accordance with one aspect of the invention, requests for data transfers (tasks) issued by the CPU program are stacked to await execution of corresponding I/O programs. This is accomplished by extracting from memory empty control words called channel control blocks (CCBs) from a pool of empty CCBs, initializing the CCBs with control information, and chaining them onto an active list of CCBs referred to as a work queue. I/O controllers called interpreters, relieve the CPU of all auxiliary supervision by independently interpreting I/O programs to carry out input/output operations (the term "interpreter" refers to an I/O controller which can perform channel functions or channel and control unit functions). The interpreters all have access to the work queue and may be connected through a cross-point switch to any one of a plurality of input/output devices in which data are stored. Once a request (CCB) has been stacked in the work queue, an alert is issued by the CPU to the interpreters indicating that a request is awaiting execution. A non-busy interpreter extracts a CCB from the work queue and stores it. The CCB indirectly addresses a channel program (a list of commands) through a virtual instruction counter. The first command is extracted from the memory and causes the interpreter to load an argument list indirectly addressed by the command. The argument list contains parameters describing the data sought. Using the parameters of the argument list and an indexing technique, the interpreter searches through the data sets described by the parameters and extracts a device address and a sector address on the device. The interpreter then extracts the next command in the channel program which causes the interpreter to enqueue the CCB onto an appropriate device queue and sector sub-queue. In the event that devices share a common controller, the CCB is enqueued in a queue related to that controller if the controller is inaccessible. The interpreter sends an order to the device requesting the corresponding sector and then disconnects from the device. The interpreter is now free to return to the work queue to extract another CPU request or to service a request from an I/O device.

When the desired sector is approaching the read/write heads, indicating that the data will become available, the device selects and connects itself to a non-busy interpreter by means of the cross-point switch. The device transmits its device address and the sector member to the interpreter. Using these addresses the interpreter fetches the CCB previously stored at the sector sub-queue for the device. The channel program is now reentered by utilizing the virtual instruction counter stored in the CCB to select the next channel command. The interpreter fetches the channel command from the location specified in the CCB. For a read operation, the first channel command selects the appropriate read head. After incrementing the virtual instruction counter, the interpreter fetches the next channel command which is a read command.

The CCB contains the indirect address of a buffer location containing a series of locations sufficient to store the required block of information. The information is read into the buffer and at the end of the sector, or at the end of record, if the record is greater than a full sector, the device is deselected. The argument list information is updated to contain the buffer address of the data and to indicate that the task has been completed. The CCB is no longer needed, is cleared, and returned to the pool of empty CCBs.

BRIEF DESCRIPTION OF THE DRAWINGS

FIG. 6 is a diagram of an interruption queue.

FIG. 7 is a diagram illustrating the method of searching the external maps by means of data set tables to assemble device queues containing chains of channel control blocks.

FIG. 13 is a flowchart of a typical channel program execution; and

FIG. 14 is a flowchart of a simplified version of execution of the ENQUEUE command.

TABLE OF CONTENTS

I BACKGROUND OF THE INVENTION
II BRIEF SUMMARY OF THE INVENTION
III BRIEF DESCRIPTION OF THE DRAWINGS
IV INTRODUCTORY DESCRIPTION OF THE INVENTION
V GENERAL DESCRIPTION OF THE PREFERRED EMBODIMENT
5.1 Basic Elements of Input/Output System
5.1.1 Input/Output Devices
5.1.2 Control Units
5.1.3 Interpreters/Channels
5.2 System Operation
5.2.1 Initiation of a Channel Program by the CPU
5.2.2 Channel Program Execution
5.2.2.1 Scheduling of Channel Programs
5.2.3 Control of I/O Operations
5.2.3.1 Device Address Resolution
5.2.3.1.1 Channel Program Authority
5.2.3.2 Response and Status Codes
5.2.3.3 Device Queues and the Device Table
5.2.3.4 Control of I/O Devices
5.2.3.5 Control Unit Queues
5.2.3.6 Channel Queues
5.2.3.7 Execution of I/O Operations
5.2.3.8 Exceptional Conditions (Branch Codes)
5.2.4 Interruption of the CPU
VI CONTROL OF CYCLIC STORAGE DEVICES (AN EXAMPLE)
6.1 Data Organization and Addressing
6.2 Address Translation
6.3 Queuing and Rotational Position
6.4 Channel Programming
VII SUMMARY

IV INTRODUCTORY DESCRIPTION OF THE INVENTION

Figure 1:
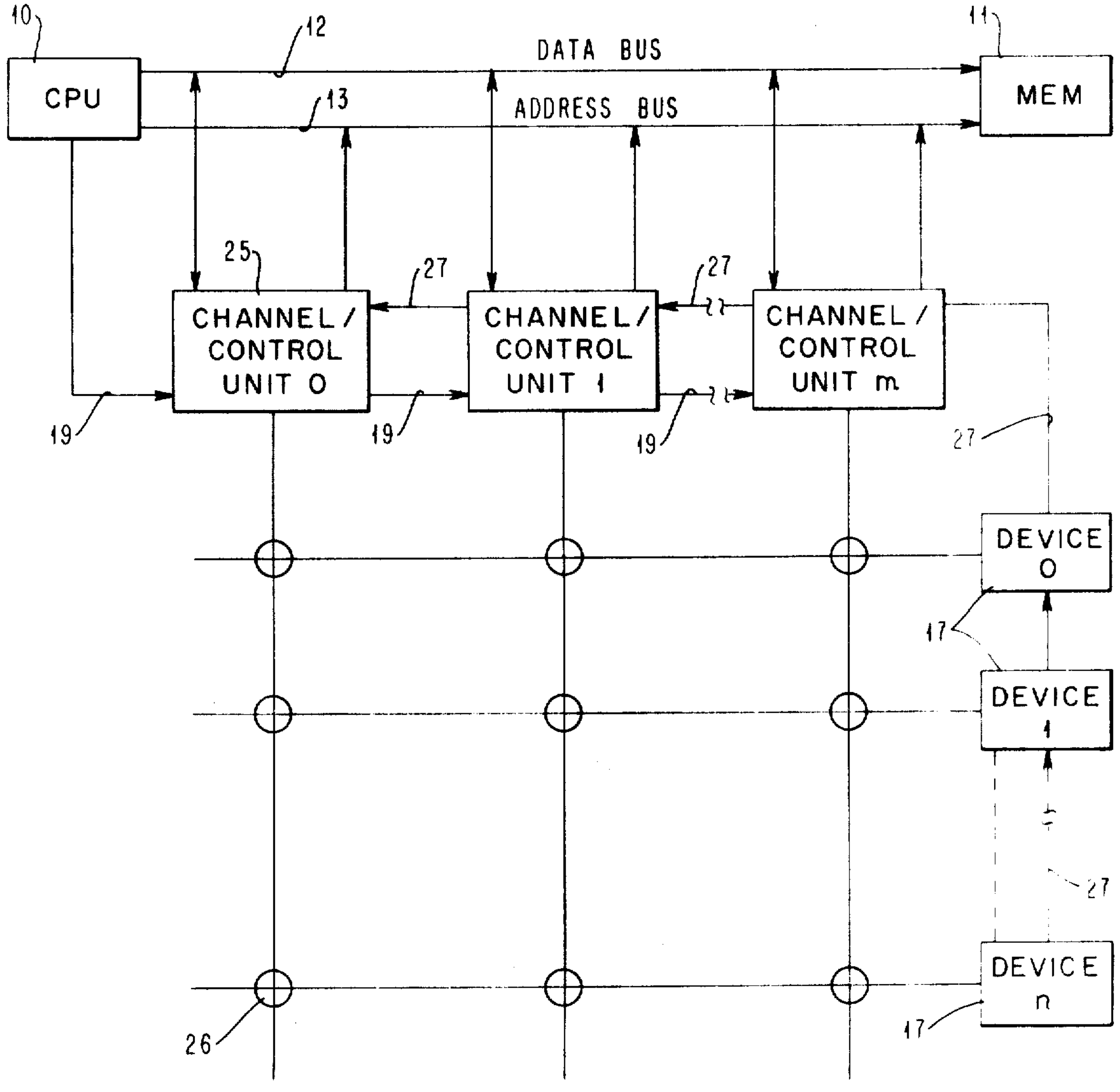
FIG. 1 is a block schematic diagram of a computer system in which the invention is embodied.

FIG. 1 shows a data processing system including an input/output system for controlling the transfer of data from cyclic devices such as disks or drums. A central processing unit 10 and a number of channel/control units 25 communicate with memory 11 by means of data and address busses. The channel/control units interconnect with a number of devices 17 by means of crosspoint switches 26. Specific connections result from switching control logic in the channel/control units. A switching system for this purpose is disclosed in U.S. Pat. No. 3,581,286 entitled Module Switching Apparatus With Status Sensing And Dynamic Sharing Of Modules by W. F. Beausoleil, filed Jan. 13, 1969, which is incorporated herein by reference.

The channel/control units (CCUs) 25 are capable of scheduling and executing input/output programs which are assembled in memory 11 under control of programs executed by the central processing unit (CPU) 10. Scheduling of input/output programs is initiated by the execution of a special instruction, REQUEST CHANNEL, in the CPU.

The REQUEST CHANNEL instruction causes the CPU to assemble an input/output task by first extracting a channel control block (CCB) from a pool of CCBs in main storage. The CCB is a small region of memory which is initialized by the CPU to contain the address of the first command of a channel program, related parameters, and other control information. The initialized CCB is placed into a work queue in memory. All CCUs are then signalled by an alert line 19 that an input/output task has been added to the queue. The CPU, having completed execution of the REQUEST CHANNEL instruction, proceeds to the next instruction.

A non-busy CCU responds to the alert, extracts a CCB from the work queue, and loads the contents of the CCB into its registers. The CCU then begins execution of the channel program specified in the CCB, behavior of the CCU being thereafter governed by the particular channel program under execution.

In the intended use of the invention, the channel program employs parameters passed in the CCB to identify a data set number, the displacement of a record in the data set, the length of the record, and a buffer address in memory which are to be involved in an input/output operation. The channel program subsequently presents the special command ENQUEUE. This command causes the CCU to employ the data set number and record displacement to determine the device 17 containing the record and the location of the record on that device. In this resolution process, the CCU makes use of a directory of data sets available to the channel program and a map of the specified data set which have been previously established by a control program executed by the CPU. Continuing with the ENQUEUE command, the CCU next places the CCB onto a queue associated with the device. An order is then issued to the device, causing the device to initiate positioning of the access mechanism, if any, and to retain in a register of the device the location of the desired record. At this point, the CCU disconnects itself from the device and stores the updated contents of its registers in the CCB. By this means, the CCU records the present status of the channel program, including the location of the next command, suspends execution of the channel program, and makes itself available to the system.

Until the device has completed the positioning of its access mechanism and has reached the sector containing the record, it is in the so-called latent period, during which no external control is needed. The CCU is thus free to begin another channel program by returning to the work queue and extracting another CCB, if any, or, upon request of one of the I/O devices 17, to service that device.

When a previously instructed device is nearing a desired sector, it attempts to signal an available CCU by means of the request bus 27. In response, a free CCU closes a crosspoint switch 26 to establish a connection with the requesting device. The CCU locates the queue in main storage related to the device (by means of the device number), accepts a sector number from the device, and, using this number, locates the related CCB. The contents of the CCB are then loaded in registers of the CCU. The CCU is now prepared to resume execution of a previously suspended channel program at the point of suspension.

In the intended use of the invention, the next command to be executed will specify a read or write operation to effect data transfer between the predetermined buffer address in memory and the instant sector or sectors of the device. Alternatively, this command may be preceded by a short sequence of commands which determine a buffer address just prior to the I/O operation. Following completion of the data transfer, the CCU deselects the device and executes subsequent commands of the channel program. These may define an iteration of the above process, post completion of I/O operations to the CPU program via an interruption or interruptions, or terminate the channel program. At the completion of the channel program the CCU returns the CCB to the pool of free CCBs and makes itself available to carry out other channel programs.

In summary, an input/output control system has been described in which the CPU alerts a CCU in the input/output system that a channel program exists for its execution. The indirect address of the channel program is placed in a work queue which is accessible to CCUs in the input/output system. The CCU selects the task from the work queue and commences to execute the channel program. When the channel program reaches a point at which further execution is not possible until the device signals that it has reached a certain status, the CCU transfers the indirect address of the channel program from the common work queue to a special device queue existing for that device. When the device indicates that it has reached the status at which the channel program may be resumed without delay, it so informs a CCU. The CCU resumes the channel program by fetching the task from the device queue and by re-entering the program at the point at which it was discontinued. This process is performed without the assistance of a supervisory program executed by the CPU.

V GENERAL DESCRIPTION OF THE PREFERRED EMBODIMENT

This general description of the invention teaches the application of the invention to practical configurations of devices, control units, channels, and switching equipment.

5.1 Basic Elements of Input/Output System

5.1.1 Input/Output Devices

Input/output devices provide external storage and a means of communication between data processing systems or between a system and its environment. Input/output devices include, but are not limited to, such equipment as card reader/punches, magnetic tape units, direct-access storage devices (disks and drums), typewriter-keyboard devices, printers, teleprocessing devices, and process control equipment including, for example, electronic telephone switching systems.

Most types of I/O devices, such as printers, card equipment, or tape devices, deal directly with external documents, and these devices are physically distinguishable and identifiable. Other types consist only of electronic equipment such as electronic telephone switching systems, and do not directly handle physical recording media. For example, a channel-to-channel adapter of the type described in U. S. Pat. No. 3,400,372, Beausoleil et al., provides a channel-to-channel data transfer path, and the data never reach a physical recording medium outside main storage. Similarly, a transmission control of the type described in U. S. Pat. No. 3,337,855, Richard et al., handles transmission of information between the data processing system and a remote station, and its input and output are signals on a transmission line.

Input/output devices ordinarily are attached to one control unit and are accessible from one channel. Switching equipment, for example, of the type described in the above identified U. S. Pat. No. 3,581,286 are available to make some devices accessible to two or more channels by switching them between two or more control units.

5.1.2 Control Units

The control unit provides the logical capabilities necessary to operate and control an I/O device, and adapts the characteristics of each device to the standard form of control provided by the channel.

All communication between the control unit and the channel takes place over an I/O interface fully described in U. S. Pat. No. 3,336,582, W. F. Beausoleil et al., Interlocked Communication System, filed Sept. 1, 1964 and issued Aug. 15, 1967. The control unit accepts control signals from the channel, controls the timing of data transfer over the I/O interface, and provides indications concerning the status of the device.

The I/O interface provides an information format and a signal sequence common to all I/O devices. The interface consists of a set of lines that can connect a number of control units to the channel. Except for the signal used to establish priority among control units, all communications to and from the channel occur over a common bus, and any signal provided by the channel is available to all control units. At any one instant, however, only one control unit is logically connected to the channel.

The selection of a control unit for communication with the channel is controlled by a signal from the channel that passes serially through all control units provided by the channel. A control unit remains logically connected on the interface until it has transferred the information it needs or has, or until the channel signals it to disconnect, whichever occurs earlier.

The I/O device attached to the control unit may be designed to perform only certain limited operations, or it may perform many different operations. A typical operation is moving the recording medium and recording data. To accomplish these functions, the device needs detailed signal sequences peculiar to the type of device. The control unit decodes orders received from the channel, interprets them for the particular type of device, and provides the signal sequence required for execution of the operations.

A control unit may be housed separately or it may be physically and logically integral with the I/O device. In the case of most electromechanical devices, a well-defined interface exists between the device and the control unit because of the difference in the type of equipment the control unit and the device contain. These electromechanical devices often are of a type where only one device of a group attached to a control unit is required to operate at a time (magnetic tape units or disk access mechanisms, for example), and the control unit is shared among a number of I/O devices. On the other hand, in electronic I/O devices such as the channel-to-channel adapter, the control unit does not have an identity of its own.

5.1.3 Interpreters/Channels

In this specification the terms "channel", "interpreter" and "channel/control unit" are used interchangeably to describe an input/output controller which performs channel functions, or channel functions plus other functions or channel functions plus control unit functions.

The exact make up of the interpreter depends upon what configuration the data processing system has. Two examples of a data processing system are shown to illustrate this, FIG. 1 and FIG. 2.

In FIG. 1 the control unit is integrated with the channel, in a logic box 25. Devices 17 are then switched between control units by means of crosspoint switches 26.

Figure 2:
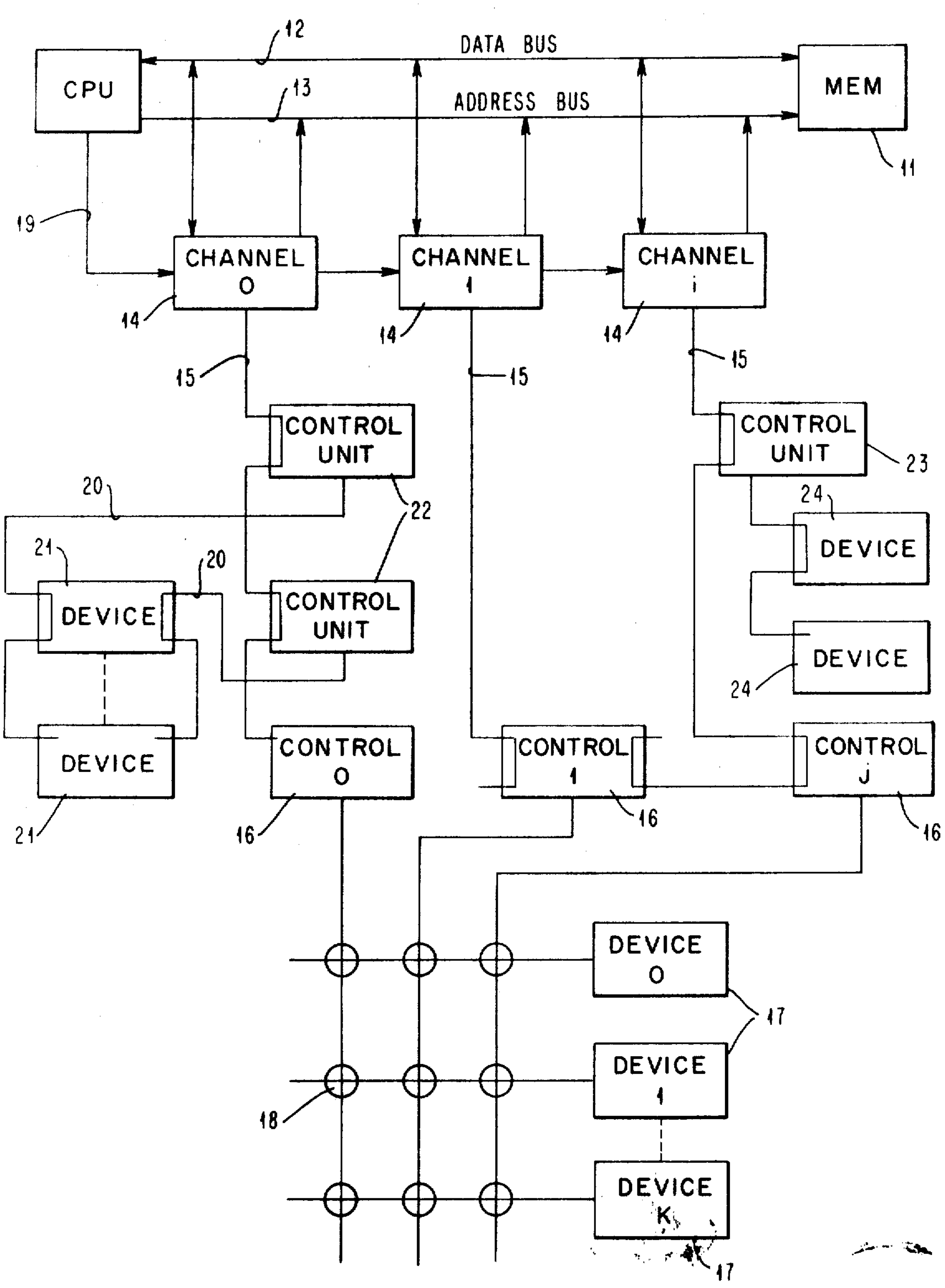
FIG. 2 is a block schematic diagram of a complex computer system in which the invention is embodied.

In FIG. 2 another conventional system configuration is shown. There channels and control units are separated into different logic blocks, 14 and 22 for example. In FIG. 2 some devices are controlled directly without switching (for example, devices 21 and 24) while other devices are switched (for example, devices 17). Switching apparatus for switching devices between control units are well known in the art, for example, see Devore et al. U.S. Pat. No. 3,372,378, entitled "Input/Output Unit Switch" filed Apr. 27, 1964, issued Mar. 5, 1968.

The channel (or that part of an interpreter performing channel functions) directs the flow of information between I/O devices and main storage. It relieves the CPU of the task of communicating directly with the devices and permits data processing to proceed concurrently with I/O operations and their control.

Channels are well known in the prior art. The I/O functions performed by the channels described in this specification are the same as those performed by the channels described in the above mentioned "IBM System/360 Principles of Operation". A more detailed description of channels can be found in U. S. Pat. No. 3,432,813 entitled "Apparatus For Control Of A Plurality Of Peripheral Devices", E. J. Annunziata et al. filed Apr. 19, 1966 and issued Mar. 11, 1969. The following description briefly describes these channel functions.

A channel provides a standard interface for connecting different types of I/O devices to main storage. It accepts program-supplied information and converts it into a sequence of signals acceptable to a control unit or device (where the control unit is integrated with the channel). During an I/O operation, the channel assembles or disassembles data and synchronizes the transfer of data bytes over the interface to main storage. To accomplish this, the channel maintains and updates an address and a count that describe the source or destination and the extent of the data in main storage. At the completion of an I/O operation, the channel converts signals from control units (or devices) into a program-compatible format.

The channel operates under the control of channel programs which direct the scheduling and initiation of I/O operations. The channel program is composed of instructions called commands. Channel programs determine the algorithms used in the transfer of information from the control unit or device to main storage and conversely.

Channel programs are located in main storage and refer to operands in main storage and in registers. As with instructions of the CPU programs, commands of channel programs may refer to any location in main storage. As distinguished from CPU programs, channel programs are not intended for generalized data processing. Commands of channel programs efficiently maintain queues and resolve logical conditions, but have only limited arithmetic capability.

Through proper channel programming, completely autonomous operation of the channels is possible. Channel programs may be written to transfer data from punched cards to disk or to perform any other similar function involving one or more I/O devices. Execution of a single channel program may be carried out on a number of channels in turn if the set of devices involved are not attached to a single channel. Controlling such a transfer rarely requires the full-time attention of a channel. Thus, a channel controlling an autonomous operation is used to control other devices by means of other channel programs as required by the CPU program.

The channel contains all the common facilities for the control of I/O operations in order that I/O operations may be completely overlapped with the activity in the CPU. The only main-storage cycles required during I/O operations in such channels are those needed to transfer data to or from main storage and for access to channel programs and operands. These cycles do not interfere with the CPU program, except when both the CPU and the channel concurrently attempt to refer to the main storage.

Additional registers in the channel are implied from the following description, and it is considered within the skill of one familiar with this art to supply such registers.

5.2 System Operation

Input/output operations are initiated and controlled by information with three types of formats: instructions, commands, and orders. Instructions are decoded and executed by the CPU and are part of CPU programs. Commands are decoded and executed by channels as part of channel programs. The command set has many of the logical and arithmetic capabilities of the instruction set but is especially oriented to the control of sequences of I/O operations. Instructions are executed independently of I/O operations; commands are not. Both instructions and commands are fetched from main storage and are functionally common to all classes of I/O devices.

Functions peculiar to a device, such as rewinding tape or positioning the access mechanism of a disk drive, are specified by orders. Orders are decoded and executed by I/O devices and their associated control units. The execution of orders is initiated by commands, and the associated control information is transferred to the devices as data during the execution of the command.

5.2.1 Initiation of a Channel Program by the CPU

Figure 12:
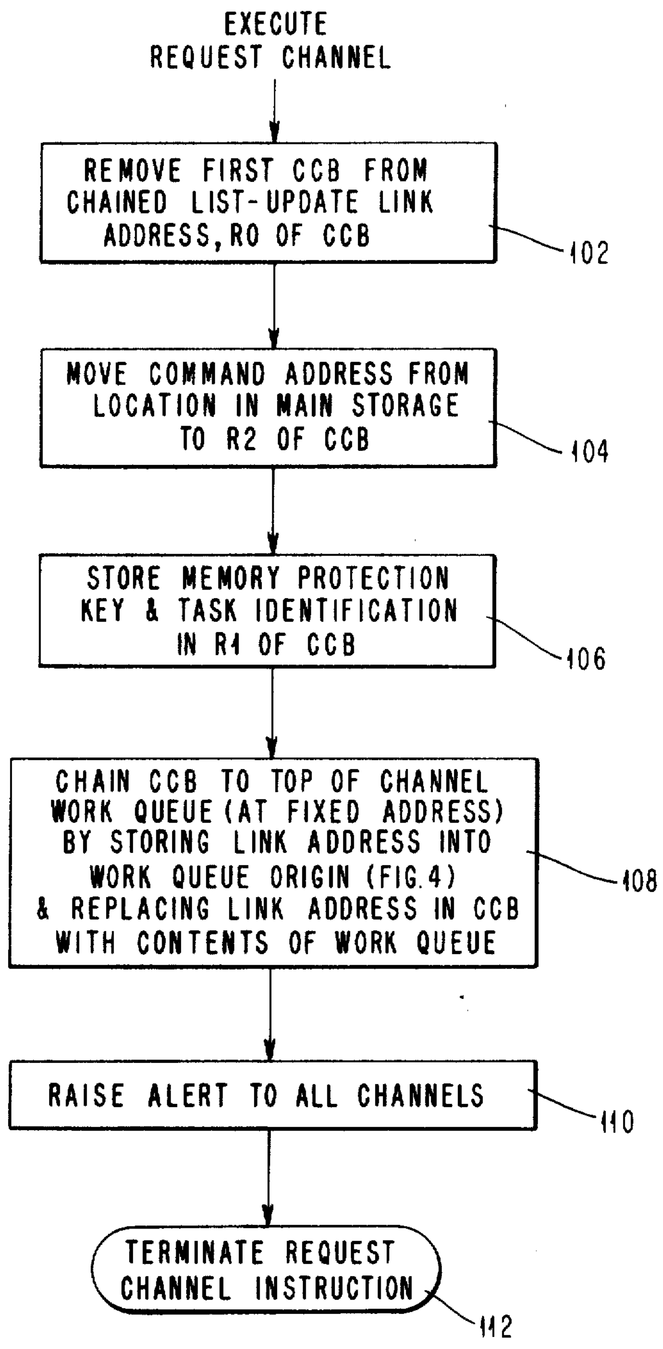
FIG. 12 is a flowchart of REQUEST CHANNEL instruction execution.

Referring to FIG. 12, the CPU program requests the execution of a channel program with the instruction REQUEST CHANNEL. This instruction causes the CPU to move specified parameters into a reserved area of main storage, associate this area with a channel program, and pass this area to a free channel, if any, as follows:

At block 102, FIG. 12, the CPU removes the first channel control block (CCB) from a chained list of free CCBs whose origin is a fixed memory address. The CCBs (FIG. 3) are 16-word regions of main storage which serve as sets of general registers (RO–R15) for channel programs during their execution. Prior to the initial execution of a channel program and at certain times during the intermittent execution of a channel program involving several I/O operations, CCBs are chained into lists. Generally, each list represents a queue of suspended channel programs awaiting a particular facility or event, such as the availability of data at an I/O device or a free channel. Word 0 (R0 of FIG. 3) of the CCB serves as a linking field in the construction of chained lists.

Words are moved from a location in main storage specified in the REQUEST CHANNEL instruction into word 2 and subsequent words of the CCB. Information moved into the CCB is accessible to the associated channel program during its execution. At block 104, the first word (word 2) moved to the CCB (R2 of FIG. 3) by the REQUEST CHANNEL instruction contains the address of the first command of the channel program to be executed.

Following this, block 105, a memory protection key and a task identifier are stored in word 1 (R1 of FIG. 3) of the CCB. The protection key is used to protect certain regions of memory from erroneous or malicious destruction by the channel program during its execution. The use of protection keys for this purpose is described in U. S. Pat. No. 3,328,768 — Storage Protection Systems, Amdahl et al., filed Apr. 6, 1964 and issued June 27, 1967. In the event of malfunction or detected channel-program error, the task identifier may be used to relate the CCB to the program execution in the CPU which issued the REQUEST CHANNEL instruction. Neither the protection key nor the task identifier is available to or may be modified by the channel program.

Figure 4:
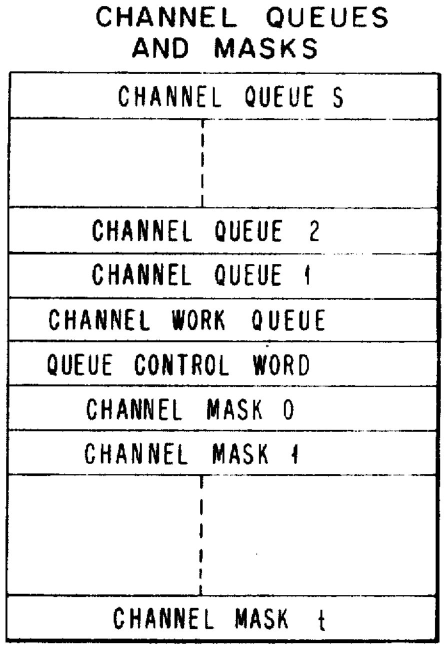
FIG. 4 is a diagram of channel queues and masks.

At block 108, the CCB is chained to the top of a common channel work queue. The origin of the channel work queue lies in a table of queue origins in memory as shown in FIG. 4, the address of the channel work queue being fixed. This queue is shared by all CPUs and channels of a multisystem which have access to the memory unit containing this table of queues.

At block 112, the CPU attempts to alert a free channel to the existence of an entry in the channel work queue. If all channels are busy, no channel will respond. If one or more channels are free, at least one channel will attend the queue. In any case, the execution of the REQUEST CHANNEL instruction is terminated (block 112) and the CPU is free to execute the next instruction.

Manipulations of the free CCB list and the channel work queue, as well as operations on other hand chained lists of CCBs, cause the list involved to be locked for the duration of the operation on the list. Each list origin occupies a single work of main storage. (Bytes 1-3 of the word contain either a pointer to the first CCB in the list or a self-pointer.) Whenever the leftmost bit of the word is zero, the list is said to be unlocked; if the bit is one, the list is said to be locked. The CPU or channel requiring access to a list fetches the word at the origin of the list and sets its leftmost byte in main storage to all ones. No other access to this location is permitted between the moment of fetching and the moment of storing all ones. The locking and unlocking of the list is accomplished by a Test and Set mechanism more fully described in U. S. Pat. No. 3,405,394 — Controlled Register Accessing, J. F. Dirac, filed Dec. 22, 1965 and issued Oct. 8, 1968. The word fetched is used by the CPU or channel to determine if the list had been locked. If locked, the CPU or channel requiring access must repeat the operation without monopolizing main storage until the list has been unlocked by the using CPU or channel. A list is usually unlocked by the CPU or a channel in the process of chaining or unchaining a CCB from the list.

5.2.2 Channel Program Execution

Figure 3:
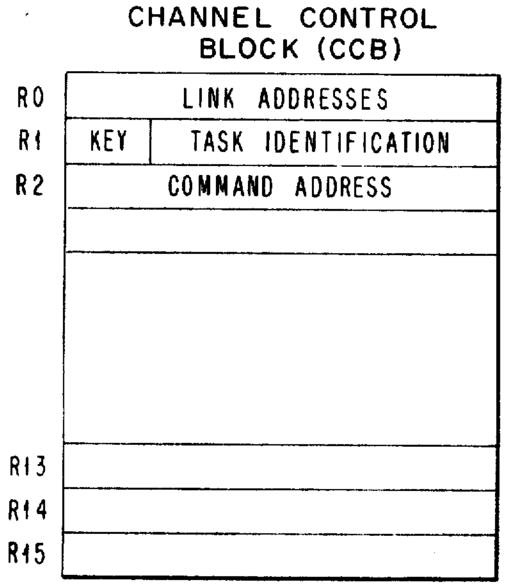
FIG. 3 is a diagram of a channel control block (CCB).

Refer to FIG. 13 whenever a channel becomes free (block 122) and is alerted by a CPU executing the REQUEST CHANNEL instruction (block 124), the channel examines the channel work queue (block 126) to see if it can execute a channel program. If no CCBs are chained to the queue, the channel remains in the free state. Otherwise, the channel removes the first CCB from the queue and loads its contents into the corresponding set of registers RO–R15, Figure within the channel, thereby making the contents of the CCB (with exceptions) available to the channel program. The channel then (block 130) fetches the first command of the channel program using the address obtained from word 2 of the CCB R2 of (FIG. 3). As each command is executed, the address in the register R2 of the channel corresponding to word 2 of the CCB is updated by the length of the command to obtain the address of the next command in sequence block 132. Branching commands may replace the contents of this register. The command is decoded at block 134 resulting in, for example, an ENQUEUE command, block 136. In an alternative embodiment, the contents of the CCB, including the current command address, may be used in situ rather than being transferred to (or from) the channel prior to execution (or upon suspension of execution). The contents of the CCB and the corresponding channel registers are therefore discussed interchangeably in the following.

The commands executed fall into three classes according to the- operations provided: arithmetic and logical operations, I/O operations, and status-switching operations.

The arithmetic and logical commands perform addition, subtraction, comparison, bit manipulation, bit testing, and movement of data between the CCB and other locations in main storage. These commands emphasize generation and modification of addresses, resolution of logical conditions, and the use of the words of the CCB as working storage.

Figure 10:
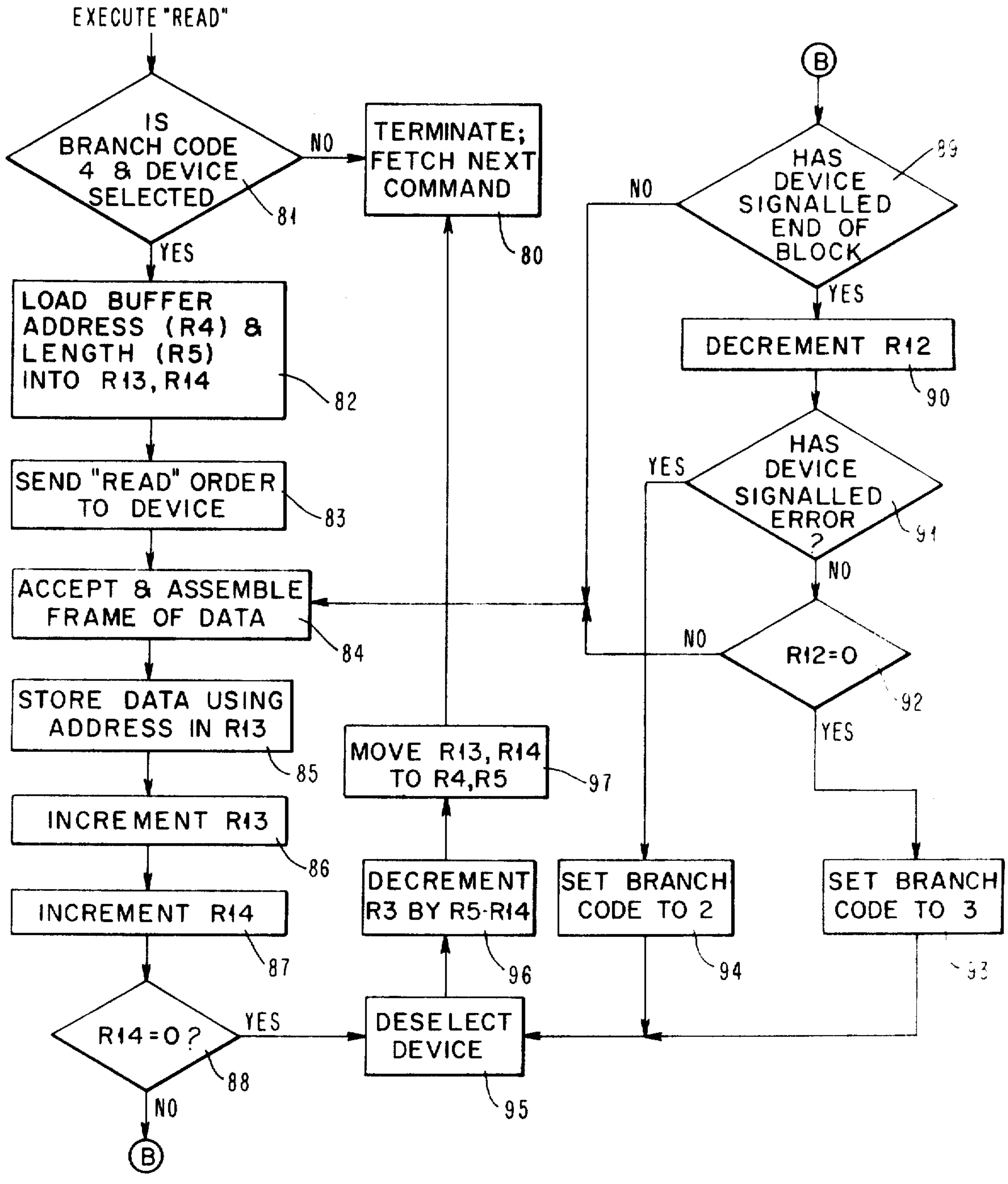
FIG. 10 is a flow chart of the execution of a READ command.

Commands which initiate I/O operations all result in the transfer of information to or from an I/O device. Depending on the operation, the information transferred is interpreted by the device as either data or a sequence of orders. The read command, FIG. 10, is disclosed by way of example.

Figure 9A:
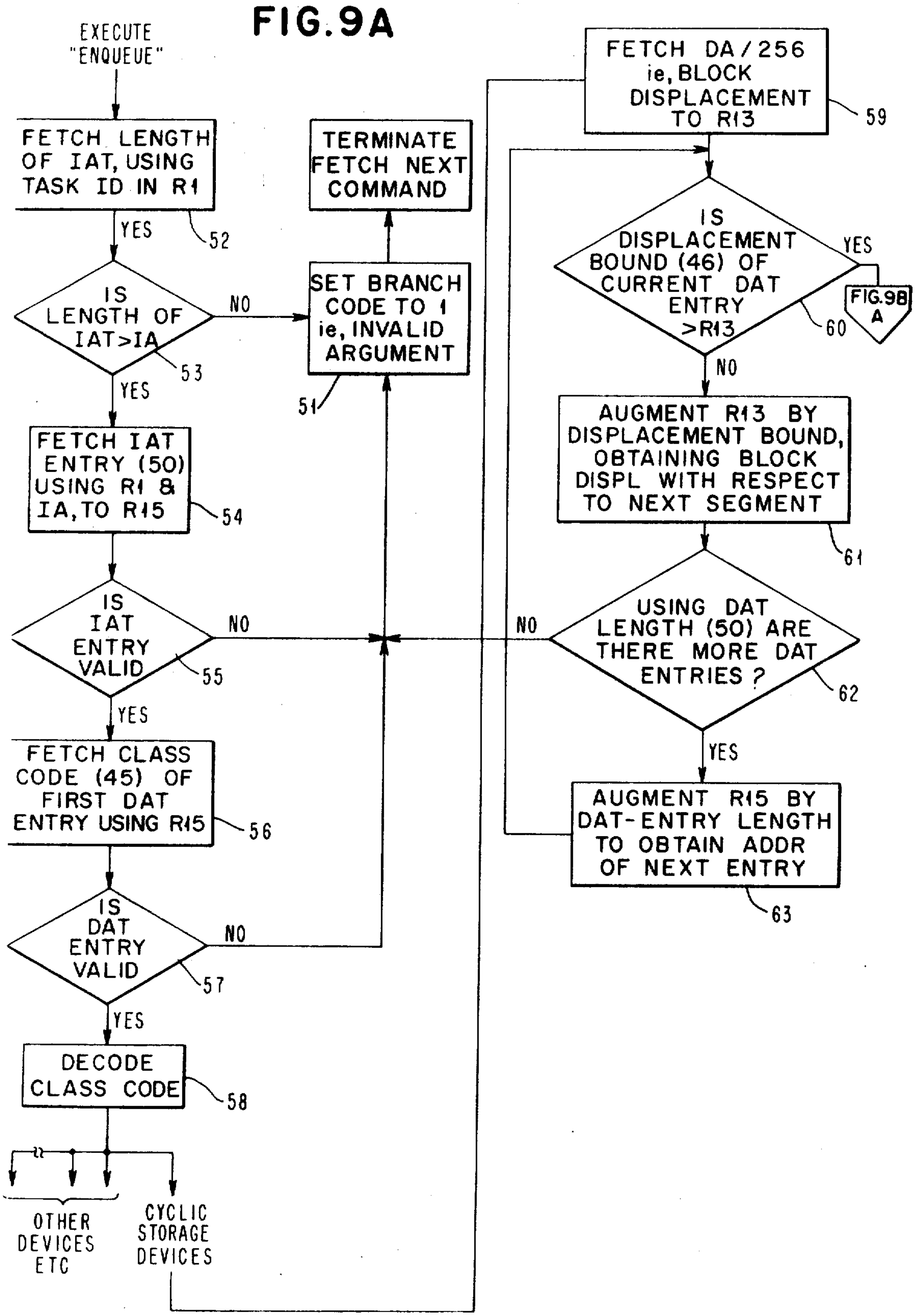
FIGS. 9A and 9B are a flow chart of the execution of the ENQUEUE command.
Figure 9B:
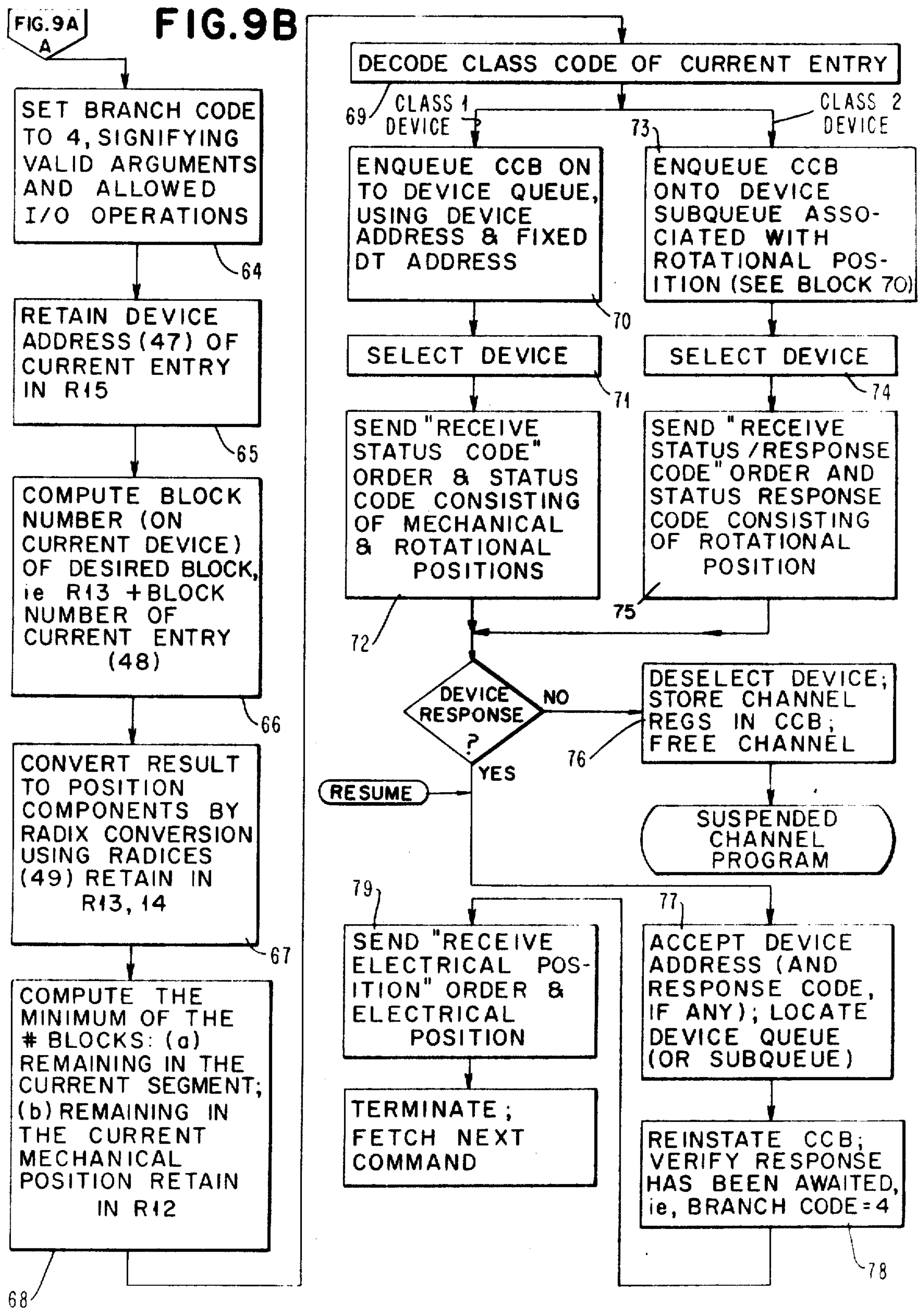

The status-switching commands facilitate multiprogramming and parallel processing of programs executed both by the CPU and by the channels. (Multiprogramming refers to the interleaved execution of two or more programs by a CPU or channel. Parallel processing refers to the execution of a number of programs by a like number of CPUs or channels of a single system). These commands schedule and terminate channel programs, maintain queues used by more than one CPU or channel, and initiate I/O interruptions of the CPU. The ENQUEUE command of FIGS. 9A, 9B or FIG. 14 is disclosed by way of example.

5.2.2.1 SCHEDULING OF CHANNEL PROGRAMS

Status-switching and arithmetic and logical commands may be executed by any channel. However, an I/O operation may be initiated only by a channel having access to the required device and only when the device is free to participate in the operation. To insure that both of these conditions have been met, each channel program must schedule itself.

Scheduling of channel programs is performed by the ENQUEUE command which is part of the channel program. The ENQUEUE command is generally described with respect to FIG. 14 (described in detail with respect to a specific device in Section 6.4 with reference to FIGS. 9A and 9B. This command delays the execution of a channel program until the device, an associated control unit, and an associated channel are free to begin an I/O operation. The ENQUEUE command may also be used to delay execution pending a specific response from the device (e.g., notification that a magnetic tape unit has completed a backspacing operation or that the attention key on the system console has been depressed).

Referring again to FIG. 13, to delay a channel program, the channel inserts the CCB associated with the channel program into a queue related to a busy facility or specific device response and suspends execution of the channel program (loop path 140). Execution is resumed (block 127) when the device can perform an I/O operation or tenders the specific response (block 125) and an associated channel and control unit are free. Delayed execution of a channel program may or may not involve the channel which had originally fetched the ENQUEUE command.

Whenever a channel program is suspended, the channel is free to resume execution of another channel program requiring the freed channel or to return to the channel work queue. Otherwise, the channel remains idle until either a CCB is inserted into the work queue or a channel program is resumed as a result of a change in the state of an attached device.

5.2.3 CONTROL OF I/O OPERATIONS

The control of I/O operations by the channels begins with the scheduling of a channel program, described above, and ends with the completion of all related data transfer to or from the device and all related activity in the device. During this interval several functions are performed which result in the logical connection of a channel, a control unit, and a device at a time when each of these is free to immediately perform an I/O operation.

To establish a connection merely when the elements involved are not performing another operation does not ensure that an I/O operation can be usefully begun. For example, many devices exhibit a period of latency during which they may be selected by a channel yet are unable to transfer data. Such latencies are usually due to mechanical delays, use of a cyclic storage medium, time-sharing of components, or origination of data outside of the device. The scheduling of channel programs is accomplished in such a way that latencies can be avoided in may types of devices.

The ENQUEUE command schedules the channel program by means of a sequence of actions as enumerated below (refer to FIG. 14). "Execution" of the ENQUEUE command begins with the initial interpretation of the command by a channel and ends with the completion of all related scheduling activity. This interval may include times when no channel is associated with the channel program, that is, the channel program "suspended"

1. The address of the device and the channels associated with the device are determined (block 200).
2. The conditions necessary in the device for the immediate execution of a subsequent I/O operation are identified (block 202).
3. The device is selected (block 204) and an order is sent to the device requesting that the device issue a predetermined response code when those conditions are met (block 206).
4. If the device does not immediately respond (block 208), the device is deselected block 210, and the following results:
5. The CCB associated with the execution of the channel program is placed in a queue related to both the device and the requested response code (block 212), thereby suspending the channel program and freeing the channel (block 214).
6. When the required conditions in the device are satisfied, the device acquires a free channel (block 125, FIG. 13), resumes the channel program, i.e., the suspended ENQUEUE command (block 127, FIG. 13) and transmits its address and the response code to that channel (block 216, FIG. 14).
7. Using these, the channel locates the associated queue (block 218, FIG. 14), reinstates the CCB (block 220), terminates the ENQUEUE command (block 222) and resumes execution of the channel program by re-entering at block 130 of FIG. 13.

All of the above result from the execution by the channel/interpreter of the ENQUEUE command. Subsequent commands (such as "Read FIG. 10") initiate I/O operations involving the selected device, with the following result:

8. The channel transmits an order to the device instructing the device to engage in a specific I/O operation (blocks 81–83, FIG. 10).
9. Data, if any, are passed between the device and the channel/interpreter to or from locations in main storage (blocks 84, 85, 86, 88, 89).
10. The device then transmits information to the channel/interpreter to either verify proper data transfer or to indicate that an error has occurred (blocks 51, 91 and 92). In the latter case, additional information is transmitted which fully describes the error.
11. Channel program execution is continued.
12. The device may be deselected (block 95), or selection may be retained to perform another I/O operation. If the device is deselected and the operation in the device is incomplete at the end of data transfer, i.e., branch code 3 has been set) the device may re-acquire a channel when the operation is complete. This is done by re-execution of the ENQUEUE command. Information verifying the operation or describing errors detected by the device may then be passed to the channel. The actions taken by the channel at this point depend on the outcome of the operation and whether a response from the device had been awaited by the channel program or not.
13. If the response from the device signalling completion of an operation had been awaited, subsequent events parallel 4, 5, 6, 10, and 7 above.
14. If the response was not awaited and no errors have occurred, the device is deselected and its response is ignored.
15. Finally, if the response was not awaited and an error has occurred, an interruption of the CPU is scheduled. The information describing the error is passed to the CPU as an interruption code. 5.2.3.1 DEVICE ADDRESS RESOLUTION The ENQUEUE command (FIG. 11) specifies two operands (Argument 1 and Argument 2) which together completely specify an I/O "address". The first of these, the independent argument, identifies a group of the related functions, data, device responses, or sources or destinations of information. The second operand, the dependent argument, identifies a particular function, response, etc., within the group identified by the independent argument.

These operands, in conjunction with two types of tables constructed by a control program, specify the device and the conditions necessary in the device for the continuation of channel program execution.

Figures 8, 11:
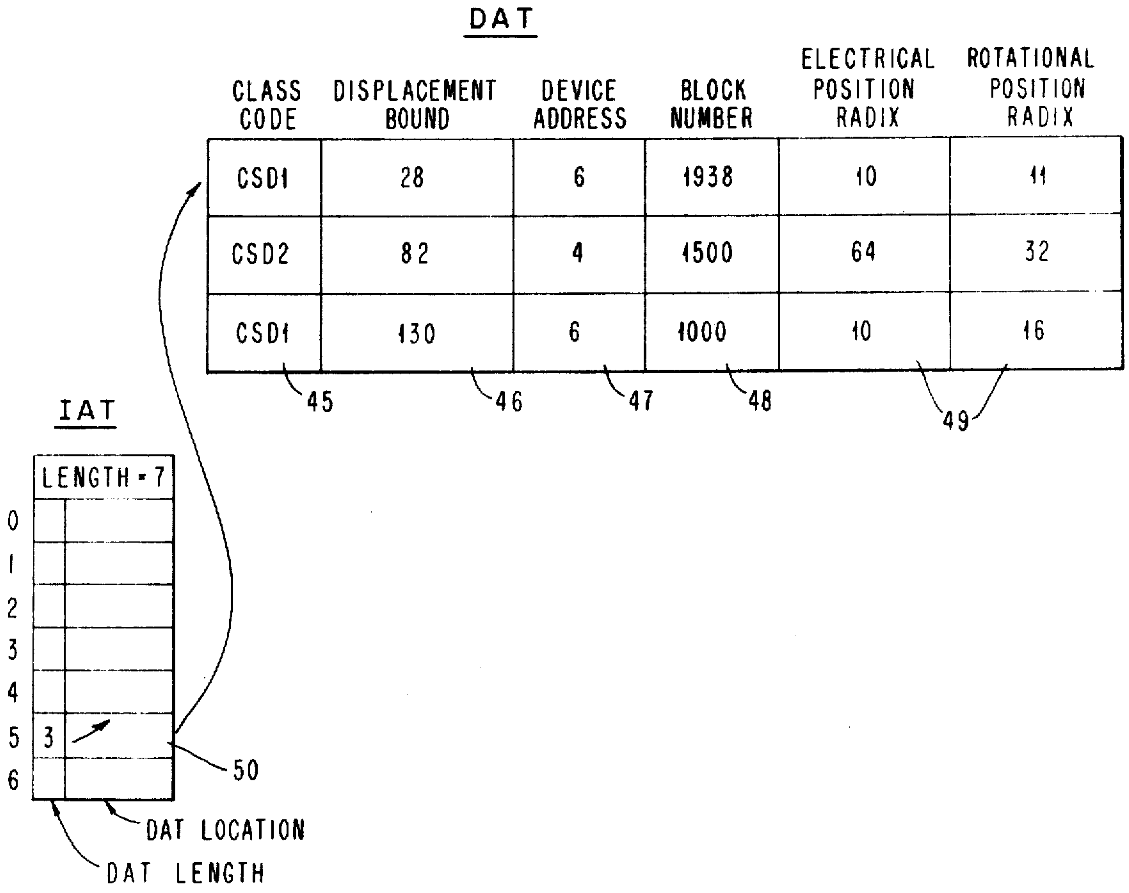
FIG. 8 is a diagram illustrating the relationship between the independent argument table (IAT) and the dependent argument table (DAT).
FIG. 11 is a table illustrating a three command loop for reading logically contiguous data.

The independent argument is interpreted with the use of an independent argument table (IAT), shown in FIG. 8, which is located in memory at an address derivable from the task identification contained in word 1 of the CCB. (Recall that in section 5.2.1 the task identification as well as a protection key were placed in word 1 of the CCB by the REQUEST CHANNEL instruction.) The channel uses the independent argument to select an entry of the IAT. To do so, the channel first compares the operand with the byte in main storage preceding the IAT. This byte describes the length of the table. If the operand, interpreted as a binary integer, exceeds it comparand, execution of the ENQUEUE command is terminated. Otherwise, the operand is multiplied by four (the number of bytes per word) and added to the address of the IAT. The result is used to fetch a word from main storage.

The entry fetched from the IAT contains a code which indicates whether the entry is valid or invalid, and if valid, whether the channel program is authorized to initiate read operations, write operations, or both. If the entry is invalid, execution of the ENQUEUE command is terminated. If the entry is valid, the code is retained by the channel.

Each valid entry of the IAT contains the address of a dependent argument table (DAT). The DAT defines the group of functions, data, responses, etc., associated with the independent argument and is used to resolve the dependent argument. The format of the DAT and its interpretation are a function of the type of group it defines. In general, resolution of the dependent argument produces the address of a device used by the channel to establish a logical connection with the device, a class code used by the channel to select specialized queuing operations, and constants related to those queuing operations.

The DAT is intended to be used to define user-oriented collections of functions, devices, and data. For example, the DAT may be used to define a collection of transmission lines, a data set residing on specific regions of a group of storage devices, or a group of responses from a process-monitoring device. Correspondingly, the dependent argument is intended to be used to select an item from the group defined by the DAT. When the group defined pertains to a single item, the dependent argument is insignificant. In this case, the DAT may be omitted. If so, the entry in the IAT related to the group contains the address of the device.

5.2.3.1.1 CHANNEL PROGRAM AUTHORITY

It is intended that the IAT be prepared by a supervisory program, executed in the CPU, which establishes the authority of the CPU program of the above discussion to invoke certain I/O devices. The IAT is the principal representation of that authority: channel programs initiated by a given CPU program may invoke only those devices or actions implied by the related IAT. By this means, the channels assume the role of mutually protecting CPU programs and their related channel programs in the dynamic use of I/O devices, a function previously relegated to supervisory programs of the CPU.

The following points with respect to the DAT and IAT should be noted:

1. Every channel program execution initiated by a CPU program execution with a given task identification is authorized to employ or refer to the same set of devices.
2. A single DAT may be referred to by entries in more than one IAT. Thus, for example, a single data set may be used by more than one CPU program.
3. Similarly, a DAT may be referred to by more than one entry in a single IAT.
4. The IAT itself may be referred to by more than one program execution of a CPU.

At several stages in the interpretation of the operand of the ENQUEUE command, the channel may refer to invalid entries within an IAT or DAT, or arguments may imply reference to locations beyond the extent of one of these tables. In each case, execution of the ENQUEUE command is terminated immediately and unsuccessfully. Subsequent commands may test the successful or unsuccessful completion of the ENQUEUE command. Alternatively, the outcome of the ENQUEUE command may be ignored, and a command intended to initiate an I/O operation may be executed. This command will be immediately terminated without involving an I/O device if the preceding ENQUEUE command had been unsuccessfully completed. The outcome of the ENQUEUE command may then be determined by subsequent commands.

5.2.3.2 RESPONSE AND STATUS CODES

Each device is capable of determining if an I/O operation can be initiated. In some devices, the criteria for determining if an operation can be initiated vary with the type of operation and the particular facilities of the devices used in the operation. Such devices may be designed to accept status codes and response codes from the channel. Use of these codes facilitates the scheduling of channel programs contending for the use of a device.

A status code is a string of bytes transmitted to a device by the channel prior to the initiation of an I/O operation. The status code represents the set of conditions in the device requisite to the initiation of a specific operation. Transmission of a status code to a device signals the device to respond when the condition associated with the status code are satisfied in the device.

Devices may be designed to accept and retain more than one status code. With these devices, the status code transmitted to the device is accompanied by a response code. When the conditions associated with one of the status codes registered in the device are met, the device responds by transmitting the corresponding response code to the channel. Multiple status codes may be accompanied by single or identical response codes, thus establishing more than one condition for resumption of a channel program.

5.2.3.3 DEVICE QUEUES AND THE DEVICE TABLE

Figure 5:
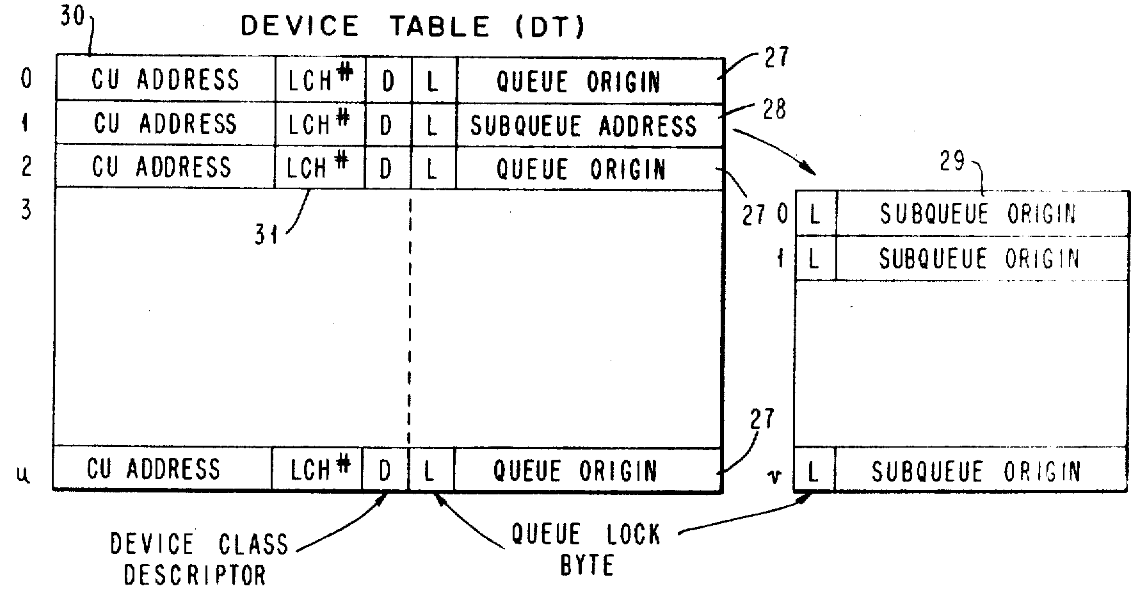
FIG. 5 is a diagram of a device table (DT).

Each device has an associated device queue (See FIG. 5). Device queues are chained lists of the CCBs which represent channel programs either using or awaiting the use of a device. Device queues may consist of a single chain of CCBs or multiple chains called subqueues according to the characteristics of the associated device.

Devices which do not employ response codes or are incapable of accepting and retaining more than one status code have device queues consisting of a single chained list. The top CCB in this list pertains to a channel program which is either awaiting a response from the device or is in execution on a channel logically connected to the device. The remaining CCBs in the list pertain to channel programs each of which cannot use the device until its predecessor has done so.

Devices which accept multiple response codes have device queues i.e., subqueues, consisting of ore than one chained list. The number of subqueues used with such a device is the maximum value of the response code defined for the device. The CCB chained to the top of a subqueue represents an executing channel program or a channel program awaiting the response from the device corresponding to the subqueue. The significance of additional CCBs in a subqueue is a function of the queuing discipline associated with the device.

5.2.3.4 CONTROL OF I/O DEVICES

After developing the address of a device during the resolution of the operands of the ENQUEUE command, the channel uses the devices address to select an entry from the device table (DT) (FIG. 5). The contents of the selected entry determined the signal sequence used by the channel/interpreter to control the device, and the queuing discipline used with the device.

The DT contains one entry for each device attached to the system. Additionally, the DT contains one entry for each control unit which may act as a distinct device during diagnostic operations and one entry for each set of two or more control units which have access to a common device. The principal contents of the entries of the DT are (See FIG. 5):

1. a device code (class descriptor) D identifying the specific type of device to which the entry relates;
2. depending on the type of device, either the origin of the device queue 27 or the address 28 of the table of subqueues 29 associated with the device;
3. a code (C.U. address) denoting the control unit or set of control units which may access the device; and 4. a code (LCH No.) denoting the channel queue related to the set of channels having access to the device.

To select an entry from the DT, the channel multiplies the device address by eight, adds the result to the fixed address of the DT, and uses the result to fetch a double word from main storage. The device code from the entry extracted together with the class code and constants obtained from the DAT determine the queuing operations to follow.

If the device code describes a device having a device queue consisting of a single chained list, the CCB associated with the channel program is immediately inserted into the device queue. If the resulting queue contains multiple CCBs, execution of the channel program is suspended, and the channel is freed. If the device queue contains only the CCB just inserted, the following sequence ensues:

1. Using the constants obtained from the DAT, the channel determines a status code if a status code is to be used with the device. The determination of the status code follows an algorithm associated with the class code extracted from the DAT.

2. The channel establishes a logical connection between itself and the device. To do so, the channel presents the address of the required device to all control units attached to the channel via its I/O interface. Each control unit compares this address with fixed addresses associated with attached devices. The control unit associated with the device whose fixed address matches the address presented by the channel returns a signal to the channel denoting the match and the corresponding device selection, thereby establishing the logical connection. Other control units ignore the information on the I/O interface until the logical connection has been broken. (See above identified Beausoleil et al. U.S. Pat. No. 3,336,582).

3.The channel presents an order an the status code, if any, to the device (via the control unit). The order requests the device to return a status report to the channel indicating whether the conditions related to the status code (or no status code) are satisfied in the device or not.

4. If the status report from the device is negative, the logical connection between the channel and the device is broken. Following this, execution of the channel program is suspended, and the channel is freed.

5. If the report from the device is positive, the ENQUEUE command is terminated, and the next command is fetched and decoded by the channel. The device remains logically connected with the channel; any I/O operation may be initiated by the channel program provided that the conditions related to the status code are the only prerequisites to the initiation of the operation.

If the device code obtained from the DT describes a device having a device queue consisting of multiple subqueues, the action taken by the channel varies with the queuing discipline. The following sequence is, however, typical of the disciplines. It illustrates most of the functions performed by the channel which are peculiar to the use of subqueues.

1. Using the constants obtained from the DAT, the channel determines an associated response code.
2. The subqueue related to the response code is located by multiplying the response code by four and adding the result to the address of the table of subqueues obtained from the DT.
3. The CCB associated with the channel program is chained to the end of the subqueue.

If the resulting queue contains multiple CCBs, execution of the channel program is suspended, and the channel is freed. Otherwise, the channel proceeds to establish a logical connection with the device. In so doing, the channel presents the response code in addition to the order and status code to the device.

When a channel requests a status report from a device and the report from the device is negative, the device must notify the system when the conditions in the device associated with the report are met. To notify the system, each free control unit attaching the device must monitor its respective I/O interface to determine if the associated channel is free. When at least one such channel is free at a time when the conditions in the device are satisfied, one control unit may establish a logical connection with both the device and a channel. Thereafter, the control unit may present the address of the device, a positive status report, and a response code (if applicable) to the channel.

Using the address of the device, the channel then locates the entry of the DT associated with the device. If a response code was presented, the channel resumes execution of the channel program associated with the CCB at the top of the subqueue related to the response code. Otherwise, execution of the channel program associated with the first CCB in the (single) device queue is resumed. Execution of the channel program continues from this point as if the channel program had not been originally suspended.

Registers 12 through 15 of the CCB (FIG. 3) are used by the channel throughout the ENQUEUE operation. These registers retain intermediate results required by the channel during the stages of that operation. As the channel examines the IAT, the authority of the channel program to read, write, etc., is retained. Similarly, during the use of the DAT and device table, the channel may determine a status code and constants which will be later used to restrict the channel program's use of a device during a subsequent I/O operation. Such information is retained in the CCB throughout the ENQUEUE operation and is examined during the interpretation of I/O commands. By suppressing I/O operations not "authorized" by the ENQUEUE command, the system is protected from improper (or malicious) action of the channel program (or its author).

5.2.3.5 CONTROL UNIT QUEUES

In attempting to establish a logical connection with a device in order to request a status report, the channel may find the associated control unit busy. An operating control unit is said to be busy to a channel when it is incapable of interpreting orders of any kind presented to it by the channel. Control units designed to operate with only one device at a time generally revert to the busy state with respect to a channel during all parts of an I/O operation involving the control unit but not the channel (as in back-spacing tape or an operation of any kind with another channel).

Busy control units are capable of recognizing the addresses of all attached devices. When the address of an attached device is presented to a busy control unit, it responds immediately with a status report indicating its busy status.

When a channel encounters a busy control unit during the ENQUEUE operation, it removes the CCB from the device queue and places it at the top of the control unit queue associated with the device. The control unit queue is located by means of the code 30 (FIG. 5), found in the DT entry for the device, which denotes the control unit or set of control units having access to the device. This code has the format of a device address and denotes an entry of the DT. The device queue field of that entry serves as the origin of a control unit queue. After placing the CCB in the control unit queue, execution of the channel program is suspended, and the channel is freed.

A control unit which has responded busy to a channel must notify the system when it becomes not busy. To do so, the control unit must monitor its I/O interface (or interfaces) to determine if the associated channel is free. When a channel becomes free, the control unit may establish a logical connection with the channel and present the address of any attached device together with a status report indicating that the control unit is no longer busy.

The channel then locates the entry in the DT corresponding to the device address presented by the control unit. The contents of this entry are used to locate the entry of the DT corresponding to the control unit. Finally, the channel extracts a CCB from the control unit queue, places the CCB at the top of the device queue or subqueue, and resumes the ENQUEUE operation. Throughout this sequence, the control unit remains logically connected with the channel.

Control units belonging to a set of two or more control units having access to a common device operate together in notifying the system that a control unit has become not busy. If any control unit in the set has responded busy to a channel, the first non-busy control unit which can acquire a free channel must report the condition.

No attempt need be made by the channel to locate an alternate path to a device when a control unit responds busy. If another path to the device exists which involves a free channel and a non-busy control unit, that control unit will acquire the free channel. Thus, execution of the channel program will be transferred to the latter channel via the control unit queue. To insure that the latter channel does not examine the control unit queue before the CCB is installed in the queue, the channel connected to the busy control unit maintains logical connection with that control unit until the CCB has been placed in the control unit queue (and that queue has been unlocked); the alternate control unit acquires a channel only after the busy control unit has been deselected.

Control unit queues are not required for control units which accommodate only one device, provided that the device does not make use of response codes. The DT entry for a device associated with such a control unit contains the address of the device itself in the code field which denotes the control unit. Thus, the device queue serves as a control unit queue for the device.

5.2.3.6 Channel Queues

Any interpreter/channel may begin execution of the ENQUEUE command. However, only channels electrically connected to a device can complete the ENQUEUE operation when logical connection with the device is required (i.e., whenever a CCB is placed in an empty device queue or subqueue). (Note that, as shown in FIG. 2, in more complex systems, a control unit may or may not have access to a device.) Thus, when communication with a device is required, the channel must determine whether it can access the device or not. If it cannot, the ENQUEUE operation must be transferred to a channel which can access the device. These functions are carried out with the aid of a table of channel queues and a list of words which control the use of the queues.

One channel queue is defined for each maximal set of channels which have access to exactly the same set of devices. For example, in a configuration consisting of two channels, one having access to two devices and the other having access to one of these two devices, two channel queues are defined. One of these queues pertains to the channel connected to the unshared device; the other pertains to the pair of channels which share a device.

The origins of the channel queues are arranged in a table in memory at a fixed location (FIG. 4). The origin of the channel work queue lies at the head of this table.

A single word, the channel queue control word, is used to maintain an inventory of the contents of the channel queues. This word follows the table of channel queue origins. The value of the bits of the queue control word indicate whether the corresponding channel queues are empty or contain CCBs. A one in the nth position of the queue control word signifies that the *n*th channel queue consists of a chain of CCBs; a zero in that position signifies that the nth queue is empty.

Whenever a channel enters a CCB into an empty channel queue, it sets the corresponding bit of the queue control word to one. If a channel empties a queue in the process of extracting a CCB from the queue, the corresponding bit is cleared. The CPU sets the first bit of the queue control word to one when a CCB is added to the channel work queue during the execution of the REQUEST CHANNEL instruction.

A table of channel mask words, following the queue control word, describes the relationship between the channels and the channel queues defined for the channels. One channel mask word is associated with each channel. The bits in the mask word determine whether the corresponding channel queues are of significance to the channel. A one in the nth bit of a mask word signifies that the nth channel queue is related to (i.e., channel i.e., the channel is in the corresponding maximum set of channels having access to a common set of devices). Generally, the first bit of every channel mask word contains a one, since the channel work queue is associated with all channels. A channel may be logically removed from a system by clearing its associated bit from all channel mask words.

Whenever the execution of the ENQUEUE command requires that a logical connection with a device be established, the channel determines if the device id accessible to the channel. To do so, the channel fetches the code 31 (FIG. 5) which determines the channel queue associated with the device from the DT entry for the device. The channel then examines the bit of its mask word identified by the channel queue code. If the bit is one, the channel is associated with the channel queue; thus, the device is accessible, and the ENQUEUE operation is transferred to another channel. The channel accomplishes this by adding the CCB to the bottom of the channel queue denoted by the channel queue code (located by multiplying the code of four and subtracting the result to the address of the table of channel queues), and, if the queue was empty beforehand, signalling the channels associated with the queue. The channel, having disposed of the CCB, is freed.

Whenever a channel is freed or is signalled by another channel or a CPU, it fetches both its channel mask word and the queue control word. The channel then develops the bit-wise product of these two words. The resultant one-bits, if any, correspond to channel queues containing CCBs related both to devices accessible to the channel and to channel programs suspended within the ENQUEUE operation. The high-order bit, if one, corresponds to a nonempty channel work queue. After determining the active queues, the channel removes a CCB from the queue related to the least significant one-bit, if any. Execution of the corresponding channel program is then assumed by the channel.

5.2.3.7 Execution of I/O Operations

Input/output operations may be initiated by channel programs following the successful completion of an ENQUEUE operation. Commands, which cause the channel to initiate I/O operations specify or imply the direction of data transmission (to or from the device), a relevant order used to instruct the device, and two registers of the CCB which contain a specification of the maximum number of bytes to be passed between the device and main storage, and the address of the first byte of the area of main storage to be involved in the operation.

To initiate an I/O operation, the channel suspends channel program execution and presents an order related to the operation to the device. The order conditions the device to send or receive data and initiate any mechanical operation related to the I/O operation. The channel then conditions itself to correspondingly receive or send information to or from main storage. Data are accepted from or sent to the device byte by byte over the I/O interface. Logically, with each byte transmitted, the channel decrements the register containing the maximum number of bytes to be handled. Transmission is stopped when either this number is reduced to zero, the device signals to the channel that transmission is complete, or information contained in CCB registers 12–15 signifies that only a lesser number of bytes may be transmitted. With each group of bytes transmitted equal in number to the width of main storage, the channel makes a reference to main storage at the location designated by the register containing the main storage address. The register is then incremented correspondingly. At the completion of transmission, the registers contain, respectively, the number of bytes transmitted less than the maximum, and the address of the byte in main storage immediately to the right of the last byte transmitted. Write operations do not affect the contents of main storage. Read operations change only those locations in main storage corresponding to bytes transmitted to the channel from the device.

All commands, including those initiating I/O operations, which cause the channel to access main storage at locations specified by the channel program invoke the storage protection mechanism (See Section 5.2.1). With every such access, the channel compares the storage key with the protection key retained in register 1 of the CCB. If, as a result, reference to main storage is not permissible, the command is terminated, and an interruption of the CPU is scheduled. (See U. S. Pat. No. 3,488,633 — Automatic Channel Apparatus, King et al., filed Apr. 6, 1964 and issued Jan. 6, 1970, for a description of the CPU interrupt operation.)

Following the completion of data transmission, the device presents a status report to the channel. If the device has indicated error conditions, the channel presents an order to the device which instructs the device to respond with a detailed description of the error. This information is placed in registers 13–15 of the CCB as required for interrogation by the channel program; channel program execution is then continued.

5.2.3.8 Exceptional Conditions (Branch Codes)

In the intended use of the invention, exceptional or error conditions resulting from I/O operations are tested for by branching commands. Branching commands following I/O commands resolve one of the following four conditions:

Branch Code 1. The specified I/O operation was suppressed. Either the resolution of the independent and dependent arguments of the ENQUEUE command were not defined by the IAT and DAT (i.e., a meaningless, undefined, or disallowed operation was implied), or the subsequent I/O command required conditions in the device not specified by the status code determined by the ENQUEUE command. In this case, the I/O operation was rejected by the device.

Branch Code 2. The I/O operation was completed, but in the process an electrical or mechanical error was detected in the device, control unit, or channel.

Branch Code 3. The I/O operation was satisfactorily completed but only in part. Re-execution of the ENQUEUE command, using appropriately modified arguments, followed by the I/O command, will continue the originally defined operation. This condition is provided as a method of incorporating I/O macro-operations of a complex nature. Such macro-operations may employ an arbitrary number of devices in succession.

Branch Code 4. The I/O operation was completed satisfactorily.

In cases 1-3 above, the channel program may interrogate the contents of CCB words 12-15 to further resolve the nature of the exceptional condition; the contents of these words depend on the type of device, if any, addressed.

5.2.4 Interruption of the CPU

The CPU is normally interrupted by a channel only as a result of executing a PROCEED command which is part of the channel program. This command establishes an entry in the CPU's interruption queue. If the priority of the task identifier specified by the command exceeds that of the currently executing task of the CPU, as denoted by a register of the CPU, an interruption of the CPU is initiated.

If the priority of a channel task is higher than the priority of a CPU task, then the CPU is signalled to interrupt. If the priority is lower an entry is placed in the interruption queue without signalling the CPU. In either case, once the entry is placed in the queue, the channel is free to proceed without taking any further action with respect to the interrupt. In prior systems, a decision based upon priority is made to either interrupt immediately or defer the interrupt until the higher priority tasks have been completed. However, in accordance with the present invention, a decision is made to interrupt immediately if the priority of the I/O task is higher than the task currently being executed by the CPU. If the priority is lower, the task is placed in the interruption queue and the channel never interrupts the CPU. Instead, the CPU, upon completion of the higher priority task, interrogates the interrupt queue to find the next task for execution, without the necessity of a hardware priority mechanism to lead back to a source device holding the interrupt information.

The interruption queue is shown in FIG. 6. The queue is a fixed-length table preceded by a control word. Fields of the control word denote the length 36 of the queue, the "in" entry of the table wherein a channel may add to the queue, and the "out" entry 38 of the table possibly containing an entry previously added by a channel (as shown). To insert an entry into the interruption queue, the channel fetches (and locks) the control word. The "in" 37 field and the "out" 38 field are compared; if these are equal, the queue is full. If these fields are unequal, the channel inserts an entry at the position specified by the "in+ field. That field is then incremented by one and compared with the length field 36. If these are equal, the "in" field is reset. The control word, as updated, is then stored (and unlocked).

Entries 33 resulting from the PROCEED command locate an event control block (ECB). (A full description of task synchronization by means of the ECB is found in IBM System/360 Operating Systems publications, for example, see IBM System/360 Operating System Supervisor and Data Management Macro Instructions, IBM Systems Reference Library, form number GC28-6647-3).

Interruption of the CPU is also initiated during the execution of the PROCEED command when no additional entry in the interruption queue is available to the channel. In this case, channel program execution is suspended until an entry in the interruption queue is made available by the CPU.

An interruption of the CPU always results from a channel program error. The entry 35 made in the interruption queue identifies the CCB corresponding to the offender.

Recoverable transient errors and the receipt of unsolicited status reports from devices more significant than Device End cause the channel to interrupt the CPU. The entries 34 placed in the interruption queue contain, respectively, error codes or status bytes and the associated device address.

VI CONTROL OF CYCLIC STORAGE DEVICES (AN EXAMPLE)

Further discussion of dependent and independent operand resolution, queuing disciplines, and channel-program operation is practical only in the context of a restricted class of I/O devices. Accordingly, this section considers the operation of the invention as applied to the control of cyclic storage devices. This class includes, but is not limited to, devices such as drums, fixed and movable head disk files, magnetic or optical strip or card files which are read or written by means of rotating drums, and electronic storage devices in which specific data may be only periodically retrieved.

6.1 Data Organization and Addressing

From the programmer's viewpoint, information recorded on cyclic storage devices is logically organized into discrete data sets. Each data set may be regarded as a "byte space", i.e., a span of byte addressed (integer displacements) ranging from zero to some maximum determined by the extent of the data set. Indexes, records, fields, etc., of logical significance to the programmer, are represented as strings of bytes in data sets, a given string of bytes being uniquely determined by the triple (data set, displacement, string length). The first two of these components comprise the "logical address" of the datum, so-called to distinguish this address form from a physical address which serves to specify a storage device and a physical location in the device.

Data recorded in cyclic storage devices is physically organized into "tracks" each containing an integral number of 256-byte, periodically accessible blocks. Depending on the specific type of device, higher units of organization such as "cylinders" or "volumes" may also be used.

A specific block of data may be physically located by means of a "physical address" comprising the four parts (device address, mechanical position, electrical position, rotational position). Here, the device address denotes a specific device on which the block is located by one or more of the three positional components. The mechanical position component specifies all significant non-periodic actuation required to access the block (such as access-mechanism or head position of movable head disk files). The electrical position component specifies all electrical selection (such as head selection of disk files or ring selection of electronic stores). The mechanical and electrical position parameters together specify a track of the device. A particular block within a track is located by the rotational position component.

In the present example we consider only those devices having the property that all tracks of a given device have the same integral number of blocks and all mechanical positions of a given device have the same integral number of electrical positions. By means of appropriate address decoding in storage devices or their control units, we may choose to assign the numbers 0, 1, 2, . . . to the "successive" positions related to each of the three positional components of the physical address. Given this assignment, the three positional components may be together regarded as a mixed-radix integral address, successive values of which denote successive blocks of a device. Thus, it is meaningful to discuss the first block of a device (i.e., that with positional components o, o, o) and a sequence of consecutive blocks which spans tracks, "cylinders", etc.

6.2 Address Translation

The mapping from the set of logical addresses specified by the programmer to the set of physical addresses which describe the residence of the logically addressed data is represented in the independent and dependent argument tables. The two components of a logical address (data set, displacement) are presented during the execution of a channel program, as the independent and dependent arguments, respectively, of the ENQUEUE command prior to a related read or write operation. As previously described in 5.2.3.1 above, the independent argument is used to locate a DAT by means of the IAT. In the context of the present example, this process corresponds to the resolution of the data set component of the logical address by locating the corresponding DAT.

The DAT, when used with cyclic storage devices, represents the mapping of a given data set onto the physical address space implied by the configuration of storage devices. In those cases where a data set is containable in a single sequence of consecutive blocks of a single device, the DAT consists of a single entry. This entry defines the extent of the displacement component of the logical address (i.e., the maximum defined value of the dependent argument), the device containing the data set, address of the initial block, and the radices of the block address components appropriate to the device. Using this information, the channel can determine the physical address corresponding to a given displacement by means of a mixed radix arithmetic.

More generally, the byte space of a data set may be divided into a number of segments, each of which is accorded with a distinct segment of storage. The correspondence between logical and physical addresses is then represented by a DAT having multiple entries, one for each segment of the data set. This arrangement facilitates practical and specialized allocation of storage space by an operating system.

FIG. 7 illustrates a data set, having an extent of 130 blocks of 256 bytes each, whose byte space has been segmented into three regions 39, 40, 41. The mapping of these regions into corresponding regions 42, 43, 44 of two storage devices is also shown. Note that whereas the address space of the data set is defined in bytes, the address space of the devices is defined only in blocks, as is the mapping between the two. Shown above the number lines, which denote the address spaces of the devices, are block numbers in base-ten representation. Shown below the number lines are the beginning block numbers of each region represented in mixed-radix form. Here we assume that device '6' has 16 blocks in each track and 10 electrical positions per mechanical position. Thus, block 1000 corresponds to mechanical, electrical, and rotational positions (6, 2, 8); i.e., the number 1000 represented in base (*r*, 10, 16), where r is any sufficiently large integer. Device '4' is assumed to have 32 rotational and 64 electrical positions; it has only a single mechanical position.

FIG. 8 illustrates the content of the DAT which represents the mapping of FIG. 7. The first, second, and third entries (rows) of the DAT pertain to regions 39, 40, 41 of the byte space, respectively. For example, the first entry defines the set of physical addresses relating to the first 28 blocks of byte space (as defined by field 46). These blocks lie on device '6' (as defined by field 47), beginning with block 1938 of that device (see field 48). The position components of these blocks are computed with the use of the electrical and rotational position radices 49. The second entry of the DAT similarly defines the second region of the byte space, i.e., the 54 blocks numbered 28, 29, . . . , 81, via., those blocks numbered less than 82 and not defined by the first entry. The IAT entry 50 denotes that the DAT has only three entries; thus, the third DAT entry implies that the extent of the byte space is 130 blocks.

6.3 Queuing by Rotational Position

When applied to cyclic storage devices, the ENQUEUE command functions to suspend execution of a channel program during the latent period of the involved storage device. This period extends from the time the device is instructed to assume a specified mechanical position to the time when the rotational position of the device corresponds to a desired block. Suspension of channel programs, and resultant channel multi-programming, is accomplished by means of coordinated queuing operations in the channel and the device.

Two classes of storage devices are considered in this example with respect to the type of queuing operations used (see 5.2.3.2, 5.2.3.3).

1. Devices, such as movable-head disk files, which have a multiplicity of mechanical positions, which accept at most one outstanding status code, and which do not employ response codes.

2. Devices, such as fixed-head files, which have a single "mechanical position" but which accept one status code and one response code for each rotational position of the device, the values of these codes being simply the corresponding rotational position numbers.

Devices of the first class are scheduled by means of simple device queues, whereas devices of the second class employ multiple subqueues for each device. Thus channel multiprogramming, with respect to a single device, is possible only with devices of the latter class. (Multiprogramming of a channel with respect to a collection of devices is always possible.)

An example of DAT entries for devices of each class is given in FIG. 8. The first entry of the DAT shown pertains to a device of the first class (device '6'); this device exhibits 20 mechanical positions (FIG. 7). The second DAT entry describes a device of the second class (device '4'), which makes no use of the mechanical position component of the physical address (FIG. 7). The first field 45 of DAT entries serves to classify cyclic storage devices into the above classes.

With either class of device, queuing by rotational position is accomplished by means of the following sequence:

1. The physical address of a specified block is determined from the logical address during execution of an ENQUEUE command.
2. The CCB associated with the channel programs is enqueued onto the device queue of the device indicated in the physical address (class 1 devices) or onto a device subqueue associated with the device and rotational position indicated in the physical address (class 2 devices).
3. The device is selected by the channel, and the rotational position number and mechanical position, if any, are passed to the device as a status code. With class 2 devices, a response code identical to the rotational position is also sent.
4. The channel is freed.
5. When the device assumes the mechanical and approximate rotational position defined by the status code, it attempts to acquire a free channel.
6. If the device fails to acquire a channel by the time the desired rotational position has passed, the device ceases to attempt to acquire a channel. Acquisition of a channel is then attempted periodically, just prior to the desired rotational position, until a channel is acquired.
7. The device address and response code (class 2 devices) is passed to the channel. These are then used to locate the related CCB.
8. Finally, the electrical position component of the physical address is passed to the device, thus establishing the full physical address for subsequent I/O operations.

6.4 Channel Programming

The basic channel program, or subprogram of more complex programs, used with cyclic storage devices is shown in FIG. 11. The program is a loop consisting of three commands, each execution of which serves to read a string of data contained wholly within a single segment of a data set and within a single mechanical position of a device. Iterative execution of the loop reads a logically contiguous string of bytes, i.e., a sequence of bytes having consecutive logical addresses.

The following assumptions are made with respect to the flow charts of FIGS. 9A, 9B and 10 of a typical I/O operation in accordance with an aspect of the invention:

1. A read operation is assumed to involve an integral number of frames;
2. A device involved in the operation and its control unit are assumed to be free;
3. The channel involved in the operation is assumed to be able to select the device; i.e., the use of channel and control unit queues, mask word, etc. as described previously is not shown in the flow charts; and
4. The device queue or subqueue associated with the operation is assumed to be empty.

The first command (ENQUEUE) presents the logical address of the first byte of the desired string of data. The independent nd dependent arguments of this command are given in registers 2 and 3, respectively, of the CCB. FIGS. 9A–9B detail the execution of the ENQUEUE command. Blocks 52 through 58 illustrate the resolution of the independent operand; the included procedure establishes the validity of the independent operand and locates the corresponding DAT. References to "branch codes" (as in block 51) refer to the four (exceptional) conditions described in 5.2.3.8.

Blocks 59 through 68 detail the resolution of the dependent argument. Included within this sequence is a loop, blocks 60–63, in which the segment of the data set containing the first byte of the desired string is determined. Block 68 determines the maximum number of blocks which may be read or written following this execution of ENQUEUE; subsequent blocks, if any, must be obtained by means of the iteration of FIG. 11. Blocks 69–75 perform positional queuing involving the device. Blocks 77–79 complete the ENQUEUE operation; these are performed subsequent to channel program suspension.

Detailed operation of the second command (FIG. 11) of the channel program is shown in FIG. 10. The block 81 of this sequence ascertains that the read operation may be validly executed, i.e., that a preceding ENQUEUE operation has been properly executed. Blocks 82–89 perform the read iteration. In block 82 the buffer address (R4 of read command FIG. 11) are loaded into positions R13 and R14 of the CCB (FIG. 3). a "read" order is sent to the device, block 83. The data read from the device is assembled, block 84, and stored (block 85) in the memory buffer area pointed to by the address in CCB register R13. The buffer address, R13, is incremented at block 86 and the record length, R14, is incremented at block 87. This iteration is terminated if register 14 of the CCB (the length of desired string) is reduced to zero or if the present block of 256 bytes has been read. Blocks 90–92 reinitiate this loop if the current block does not terminate a mechanical or segment boundary. The block segment boundary was computed in logic block 68 of FIG. 9B, and placed in R12 of the CCB. If such a boundary occurs (register 12 has been decremented to zero, block 92), the operation is completed with branch code 3, causing the third command of FIG. 11 to reiterate the three-command loop. During each iteration of the loop, blocks 86 and 87 insure that the buffer address R13, string length R14, and independent argument R15 in the CCB are appropriate to a subsequent iteration.

VII SUMMARY

The invention has been described in the context of an input/output control system in which, by way of example, a primary controlling module or central processing unit (CPU) is provided for executing a primary or main CPU program, and a secondary controlling module or input/output data channel is provided for executing secondary programs or channel programs as directed by the CPU program. However, it should be understood that the invention is not limited to an input/output control system, The many aspects of the invention find use in a more generalized multiprocessing system wherein the channels or secondary controlling modules are more sophisticated processors capable of executing programs such as those executed by a central processing unit. Furthermore, the unique queuing, masking, path finding and other processing techniques described in this specification are applicable to multiprocessing and multiprogramming systems wherein, for example, manipulation of instruction subsets to provide for multiprogramming and parallel program execution of the subsets on the various secondary controlling modules is provided.

The system further provides for a generalized interprocessor communication and processor interruption which finds use within a multiprocessing system.

The input/output control system described has the capability of automatically scheduling and dispatching input/output programs originating from an unprivileged instruction in a CPU program without the need for a supervisory control program. By the use of unique tables relocation of data sets is provided and programs are passed from one channel to another channel. Re-initiation of programs previously suspended is accomplished in response to specified conditions arising within the system. By use of a unique three-command loop, data are read or written in logically contiguous groups of data even though the data is physically scattered throughout data sources within the system.

Automatic path selection of data paths connecting the different modules of the system is accomplished by a unique system of control words, queues and mask words arranged in tables which are automatically manipulated and inter locked by the different modules of the system.

By further use of these unique tables, partitioning of modules within the system is accomplished by assigning certain modules to predetermined configurations which can be reconfigured by changing the state of the tables.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system including a central processing unit; a memory area containing a queue of I/O tasks; a temporary memory area; interpreters; and I/O devices, one of said I/O devices having means for generating a signal when it reaches a point where it needs direct control by said controller, the method of controlling an input/output operation performed by one of said interpreters comprising:

selecting an I/O task from the queue of tasks;

performing the task, which is in the form of an I/O program, up to the point where the controlled I/O device involved in the task does not need direct control for a relatively long period of time;

temporarily storing in the temporary memory area the partially performed task in a device queue for the device being controlled;

selecting another task from the queue of tasks and executing the I/O program associated with the new task;

monitoring the I/O device for the signal generated by the device when it reaches a point where it needs direct control; and fetching the partially performed task previously stored in the device queue in response to the signal generated by the device to thereby resume the previously suspended I/O program.

2. The method of reading logically contiguous groups of data recorded in blocks on physically non-contiguous locations of auxiliary storage I/O devices in a stored program data processing system, said system including a memory in which a dependent argument table is stored, said table containing a class code, block number and parameters defining a device queue and the data sought, and in which a channel control block (CCB) is stored which is initialized to contain a buffer address, a string length and a pointer to an independent argument table the method comprising a program loop of commands executed as part of a channel program execution of which commands by an I/O interpreter serves to read a string of data contained wholly within a single segment of a data set and within a single mechanical position of a device, the repetitive execution of said loop reading a logically contiguous string of bytes having consecutive logical addresses, comprising the steps of:

executing a first enqueue command, having independent and dependent arguments, which command presents the logical address of the first byte of the desired string of data, including the steps of resolving said independent argument of said enqueue command to locate an entry in the independent argument table;

establishing the validity of said entry and locating the corresponding dependent argument table;

fetching the class code from said dependent argument table;

resolving said dependent argument including a sequence loop in which the segment of the data set containing the first byte of the desired string of data is determined; including the steps of determining the maximum number of said blocks which may be read or written following the execution of said enqueue command;

decoding said class code to identify the I/O device involved in the operation enqueuing said channel control block onto a device queue using parameters found in said dependent argument table and selecting said device; whereby said channel program may be suspended.

3. The method of claim 2 including the further steps of:

accepting a device address to thereby locate a device queue or subqueue;

fetching a CCB from an address in said device queue; and terminating said operation to fetch the next command.

4. The method of claim 3 comprising the further steps of:

executing a read command repetitively until the current block terminates on a mechanical or segment boundary; and completing the operation with a branch code to branch back to said enqueue command upon the condition that said boundary occurs.

5. The method of claim 4 further including the steps of modifying the contents of said CCB to insure that during each iteration of the three command loop the buffer address, string length and independent argument are appropriate to a subsequent iteration.

6. In a data processing system a method of providing a mechanism for automatic authority protection among components of an input/output subsystem whereby channel programs performed by a channel initiated by a CPU program invoke only those components, or actions with respect to components, which are implied by said mechanism, comprising the steps of:

preparing an independent argument table (IAT) which table establishes the authority of a CPU program to invoke certain I/O devices;

fetching a channel control block containing a task identification supplied by said CPU program, and a pointer to a channel program to be executed; and indirectly addressing said IAT by utilizing said task identification to resolve the address of said table;

whereby said channels assume the role of mutually protecting CPU programs and related channel programs and the dynamic use of I/O devices without the need for a supervisory program in the CPU.

7. The method of claim 6 further including the steps of preparing a dependent argument table indirectly addressed by at least one entry in said independent argument table; said dependent argument table defining parameters translatable to produce the address of a device with which the channel is to establish a logical connection.

8. The method of controlling a data processing system including:

a primary controlling module for executing a primary program;

a secondary controlling module for executing a secondary program stored at an indirect address in a memory shared by said primary and secondary module; and a controlled module controlled by said secondary program as executed by said secondary controlling module, comprising the steps of:

storing a control word containing the indirect address of said secondary program and control information relative to said controlled module in a first memory queue accessible by said secondary controlling module;

alerting said secondary controlling module that the control word is in the queue;

fetching said control word to said secondary controlling module;

controlling said controlled module by executing said secondary program up to an exit point in said program;

posting said exit point in said control word;

transferring said control word to a second queue accessible by said secondary controlling module; and fetching said control word from said second queue in response to a signal from said controlled module to thereby re-enter said secondary program at said exit point to thereby resume control of said controlled module in response thereto.

9. The method according to claim 8 including the further steps of:

transmitting a status code to said controlled module, said status code representing a set of conditions in said controlled module requisite to the initiation of a specific operation;

signalling said controlled module to respond when said conditions associated with said status code are satisfied in said controlled module; and transmitting a response code to said secondary controlling module when the conditions associated with said status code registered in said controlled module are met, to thereby establish a condition for resumption of said secondary program.

10. The method according to claim 9 comprising the further step of transmitting multiple status codes accompanied by response codes to thereby establish more than one condition for the resumption of said secondary program.

11. The method of controlling a data processing system including:

a central processing unit (CPU) for executing a primary program;

a channel/control unit (CCU) for executing a secondary program stored at an indirect address in a memory shared by said CPU and said CCU; and an I/O device controlled by said secondary program as executed by said CCU, comprising the steps of:

storing a control word containing the indirect address of said secondary program and control information relative to said I/O device in a work queue accessible by said CCU;

alerting said CCU that the control word is in the queue;

fetching said control word to said CCU;

controlling said I/O device by executing said secondary program up to an exit point in said program;

posting said exit point in said control word;

transferring said control word to a device queue accessible by said CCU; and fetching said control word from said device queue in response to a signal from said I/O device to thereby re-enter said secondary program at said exit point to thereby resume control of said I/O device in response thereto.

12. The method according to claim 11 including the further steps of:

transmitting a status code to said I/O device, said status code representing a set of conditions in said I/O device requisite to the initiation of a specific operation;

signalling said I/O device to respond when said conditions associated with said status code are satisfied in said I/O device; and transmitting a response code to said CCU when the conditions associated with said status code registered in said I/O device are met, to thereby establish a condition for resumption of said secondary program.

13. The method according to claim 12 including the further step of transmitting multiple status codes accompanied by response codes to thereby establish more than one condition for the resumption of said secondary program.

14. The method of controlling a data processing system including:

at least one primary controlling module for executing a primary program;

a plurality of secondary controlling modules for executing secondary programs stored at indirect addresses in a memory shared by said primary and secondary controlling modules; and a plurality of controlled modules controlled by said secondary programs as executed by said secondary controlling modules, comprising the steps of:

storing a plurality of control words containing the indirect addresses of said secondary programs and control information relative to said controlled modules in a first memory queue accessible by said secondary controlling modules;

alerting said secondary controlling modules that control words have been placed in said queue;

fetching a control word to 0ne of said secondary controlling modules;

controlling a controlled module by executing the secondary program associated with said control word up to an exit point in said program;

posting said exit point in said control word;

said control word to a second memory queue accessible by said secondary controlling modules;

fetching a respective control word from the one of said second queues corresponding to said controlled module in response to a signal from said controlled module; and re-entering said secondary program at said exit point to thereby resume control of said controlled module.

15. The method according to claim 14 including the further steps of:

transmitting a status code to one of said controlled modules, said status code representing a set of conditions in said controlled module requisite to the initiation of a specific operation;

signalling said controlled module to respond when said conditions associated with said status code are satisfied in said controlled module; and transmitting a response code to said secondary controlling modules when the conditions associated with said status code registered in said controlled module are met, to thereby establish a condition for resumption of said secondary program.

16. The method according to claim 15 including the further step of transmitting multiple status codes accompanied by response codes to thereby establish more than one condition for the resumption of said secondary program.

17. In a data processing system including primary and secondary controlling modules, controlled modules, and a memory for storing primary and secondary programs for execution by said primary and secondary controlling modules, respectively, and wherein only certain ones of secondary controlling modules are electrically connected to controlled modules in said system, said memory containing a table of the origins of secondary module queues, one queue defined for each maximum set of secondary modules which have access to the same set of controlled modules and a work queue in a table at a fixed location;

said memory also containing a secondary module queue control word for maintaining an inventory of the contents of said secondary module queues, the value of the bits in said queue control word indicating whether the corresponding secondary module queues are empty or contain control words indirectly addressing secondary programs to be performed by one of said plurality of secondary modules; a first state of the bit in the nth position of the queue control word signifying that the nth channel queue consists of a chain of said control words and a second state of the bit in said position signifying that the nth queue is empty;

the method of insuring that only secondary controlling modules having access to controlled modules involved in an operation select a corresponding secondary program for execution comprising the steps of:

setting the nth bit of the queue control word to a first state upon the condition that a control word is placed into said empty nth secondary module queue by said primary controlling module;

setting said nth bit of the queue control word to a second state upon the extraction of a control word from said queue by said secondary controlling module; and setting a predetermined bit of said queue control word to a first state when a control word is added to said work queue by said primary controlling module.

18. The method according to claim 17 further including the step of constructing a list of mask words for describing the relationship between the secondary modules and the secondary module queues defined for said secondary modules, one mask word associated with each secondary module, the bits in said mask word set to indicate whether the corresponding secondary module queues are of significance to said secondary module, a one in the nth bit of a mask word signifying that the nth secondary module queue is related to the secondary module to which said mask word pertains.

19. The method according to claim 18 further including the steps of:

setting one of said bits of each said mask word to signify that said first memory queue is associated with all the secondary modules; and logically removing a secondary module from said system by clearing its mask word.

20. The method according to claim 18 further including the step of:

determining, in response to a command requiring the establishing of a logical connection with a controlled module, if said controlled module is accessible to said secondary controlling module by examining the bit of the mask word of said secondary controlling module associated with the secondary module queue corresponding to said controlled module.

21. The method according to claim 20 further including the steps of transferring said secondary program to another secondary controlling module by adding the control word to the secondary module queue corresponding to said controlled module upon the condition that said bit in said mask word corresponding to said secondary module queue is zero; and signalling the secondary controlling modules associated with said queue upon the condition that said queue was empty before this operation.

22. The method according to claim 21 further including the steps of:

fetching both the mask word and said queue control word of a secondary controlling module; and developing the bit-wise product of said mask word and said queue control word, whereby the resultant one bits correspond to secondary module queues containing control words relating both to controlled modules accessible to the secondary module and to secondary programs suspended within said operation.

23. The method according to claim 22 further including the step of:

removing a control word from the queue related to the least significant one bit of said bit-wise product;

whereby execution of the corresponding secondary program is then assumed by said secondary module in accordance with a predetermined priority which thereby gives priority to programs which have been partially executed.

24. The method of controlling a data processing system including:

a memory;

at least one central processing unit (CPU) for executing a primary program stored in said memory;

a plurality of channel/control units (CCUs) for executing secondary programs stored at indirect addresses in said memory, said memory shared by said CPU and CCUs; and a plurality of input/output (I/O) devices controlled by said secondary programs as executed by said CCUs, comprising the steps of:

storing a plurality of control words containing the indirect addresses of said secondary programs and control information relative to said I/O devices in a work queue in said memory accessible by said CCUs;

alerting said CCUs that a control word has been placed therein;

fetching a control word to one of said CCUs;

controlling an I/O device by executing the secondary program associated with said control word up to an exit point in said program;

posting said exit point in said control word;

transferring said control word to a device queue in said memory accessible by said CCUs;

fetching a respective control word from the one of said device queues corresponding to said I/O device in response to a signal from said I/O device; and re-entering said secondary program at said exit point to thereby resume control of said I/O device.

25. The method according to claim 24 including the further steps of:

transmitting a status code to one of said I/O devices, said status code representing a set of conditions in said I/O device requisite to the initiation of a specific operation;

signalling said I/O device to respond when said conditions associated with said status code are satisfied in said I/O device; and transmitting a response code to said CCUs when the conditions associated with said status code registered in said I/O device are met, to thereby establish a condition for resumption of said secondary program.

26. The method according to claim 25 including the further step of transmitting multiple status codes accompanied by response codes to thereby establish more than one condition for the resumption of said secondary program.

27. In a data processing system including a CPU, channel control units (CCUs), I/O devices and a memory for storing primary and secondary programs for execution by said CPU and CCUs, respectively, and wherein only certain ones of channel control units (CCUs) are electrically connected to I/O devices in said system, the method of insuring that only CCUs having access to devices involved in an operation select a corresponding secondary program for execution comprising the steps of:

arranging the origins of channel queues in a table of channel queues, one queue defined for each maximum set of CCUs which have access to the same set of devices and a work queue in said table in said memory at a fixed location;

providing a channel queue control word for maintaining an inventory of the contents of said channel queues, the value of the bits in said queue control word indicating whether the corresponding channel queues are empty or contain control words indirectly addressing secondary programs to be performed by one of said plurality of CCUs; a one in the nth position of the queue control word signifying that the nth channel queue consists of a chain of said control words and a zero in said position signifying that the nth queue is empty;

setting the corresponding bit of the queue control word to a first state upon the condition that a control word is placed into a empty channel queue;

setting the corresponding bit of the queue control word to a second state upon the extraction of a control word from said queue; and setting a predetermined bit of said queue control word to a first state when a control word is added to the work queue.

28. The method according to claim 27 further including the step of constructing a list of channel mask words for describing the relationship between the CCUs and the channel queues defined for said CCUs, one channel mask word associated with each CCU, the bits in said mask word set to indicate whether the corresponding channel queues are of significance to said CCU, a one in the nth bit of a mask word signifying that the nth channel queue is related to the CCU to which said mask word pertains.

29. The method according to claim 28 further including the steps of:

setting one of said bits of each said channel mask word to signify that said work queue is associated with all the CCUs, and logically removing a CCU from said system by clearing its mask word.

30. The method according to claim 28 further including the steps of:

determining, in response to a channel command requiring the establishing of a logical connection with a device, if said device is accessible to said CCU by examining the bit of the mask word of said CCU associated with the channel queue corresponding to said device.

31. The method according to claim 30 further including the steps of transferring said secondary program to another CCU by adding the control word to the channel queue corresponding to said device upon the condition that said bit in said channel mask word corresponding to said channel queue is zero; and signalling the CCUs associated with said queue upon the condition that said queue was empty before this operation.

32. The method according to claim 31 further including the steps of:

fetching both the channel mask word and said queue control word of a CCU; and developing the bit-wise product of said channel mask word and said queue control word, whereby the resultant one bits correspond to channel queues containing control words relating both to devices accessible to the CCU and to secondary programs suspended within said operation.

33. The method according to claim 32 further including the steps of:

removing a control word from the queue related to the least significant one bit of said bit-wise produce whereby execution of the corresponding channel program is then assumed by said CCU in accordance with a predetermined priority which thereby gives priority to programs which have been partially executed.

34. In a data processing system including a central processing unit; a memory area containing a queue of I/O tasks; a temporary memory area; interpreters; and I/O devices, one of said I/O devices having means for generating a signal when it reaches a point where it needs direct control by said controller, the method of controlling said system to transfer data between a computer memory and cyclic devices in which data are recorded in sectors of fixed block lengths and in which the devices are capable of signalling when they reach any desired sector, comprising the steps of:

scheduling and executing input/output (I/O) programs on a plurality of said interpreters, each interpreter capable of being logically connected to a device through switching means;

placing I/O tasks in a queue in a memory common to said interpreters;

extracting tasks from said queue;

executing I/O programs associated with said tasks;

storing the I/O program associated with a device in a device queue for said device during latent periods of said device;

re-entering the program by extracting said programs from the device queue in response to means signalling that said device has reached a point where its program can be resumed; and resuming execution of said program.

35. In a data processing system including a central processing unit; a memory area containing a queue of I/O tasks; a temporary memory area; interpreters; and I/O devices, one of said I/O devices having means for generating a signal when it reaches a point where it needs direct control by said controller, the method of controlling an input/output control system comprising the steps of:

stacking requests for data transfer to await execution of corresponding I/O programs by extracting from memory empty channel control blocks (CCBs) from a pool of empty CCBs in a shared memory, said CCB including a virtual instruction counter;

initializing the CCBs with control information;

chaining the CCBs onto an active list of CCBs in a general work queue in said memory;

independently interpreting I/O programs to carry out input/output operations, by means of interpreters having access to said work queue and switchably connected through switching means to any one of a plurality of input/output devices in which data are stored;

issuing an alert signal to the interpreters upon the condition that a CCB has been added to said work queue;

extracting a CCB from said work queue in response to said alert signal;

storing said CCB in said interpreter;

addressing said memory with the contents of said virtual instruction counter to thereby extract from the memory an ENQUEUE command;

loading into said interpreter an argument list specified by said ENQUEUE command, said argument list containing parameters describing the data involved in an I/O transfer;

converting operands described by said parameters to a device address and a sector address on the device;

storing said addresses in said interpreter;

enqueuing the CCB stored in said interpreter onto an appropriate device and sector subqueue;

issuing an order to the device requesting the corresponding sector; and disconnecting said interpreter from the device, whereupon the interpreter is free to return to the work queue to extract another task or to service a request from an I/O device.

36. The method according to claim 35 above further including the steps of:

signalling said interpreters when the desired sector is available, to thereby initiate the selecting and connecting of the device to a non-busy interpreter by means of said switching means;

storing the device address and the sector number at said interpreter in response to said signalling means;

fetching the CCB previously stored at the sector subqueue for the device by utilizing said device address and said sector number; and selecting the next channel command by utilizing the virtual instruction counter stored in the CCB to thereby reenter the channel program.

37. The method according to claim 36 comprising the steps of:

storing in said CCB the indirect address of a buffer location containing a series of locations sufficient to store a full sector or block of information;

deselecting the device in response to an end of record indication;

updating the argument list information to contain the buffer address of the data; and indicating that the task has been completed to thereby initiate an interrupt.

38. The method according to claim 37 further comprising the steps of:

storing an interruption queue comprising a fixed length table preceded by a control word stored in said memory;

comparing the priority of a CPU task with the priority of a task currently being executed by said interpreter in response to said interrupt;

denying said interrupt to said interpreter upon the condition that a higher priority task is stored in said CPU;

entering said task into said interruption queue; and interrogating said queue upon completion of said higher priority task to thereby process the interruption placed therein by said interpreter.

39. In a data processing system including a central processing unit (CPU), a plurality of input/output devices, a plurality of interpreters switchably connectable to ones of said plurality of input/output devices, and a storage unit shared by said CPU and said plurality of interpreters, said storage unit including a general work queue dedicated area, the method of processing I/O requests by said interpreters comprising the steps of:

decoding by said CPU of an instruction request for access to one of said plurality of input/output devices;

storing by said CPU in said general work queue in said storage unit a control item containing control data corresponding to said request;

generating by said CPU an alert signal indicating to said interpreters that an item has been added to said work queue;

extracting an item from said work queue by one of said interpreters said alert signal;

registering the contents of said item in said interpreter; and interpreting the control data in said item to thereby service the request for access to one of said plurality of input/output devices.

40. The method according to claim 39 further including the step of suppressing said alert signal to the other of said interpreters.

41. In an input/output control system in which a channel program being executed by a channel is halted pending the occurrence of a condition at an I/O device controlled by said channel, a method of reinitiating said channel program in response to a previously specified condition at said device comprising the steps of:

transmitting to said device a status code representing the set of conditions in the device requisite to the initiation of a specific I/O operation;

signalling said device to respond when the conditions associated with said status code are satisfied in said device;

responding to said channel with a predetermined response code when the conditions associated with said status code registered in said device are met.

42. In an input/output control system in which a channel program executed by a channel is suspended, the method of establishing a logical connection between said channel and a device over an interface connectable between said channel and device to thereby cause the resumption of said channel program comprising the steps of:

requesting a status report from said device;

monitoring the interface between said channel and said device to determine if said channel is free; and establishing a logical connection between said device and said channel at a time when said predetermined conditions in said device are satisfied.

43. The method according to claim 42 comprising the further steps of:

transferring the address of the device, and a response code to said channel;

locating an entry in a device table associated with said device by utilizing the address of said device; and resuming execution of the channel program associated with a channel control block located in a subqueue of said table identified by said response code.

44. In an input/output control system a method of automatic data path selection to devices attached to control units and channels in said system comprising the steps of:

monitoring an I/O interface between said control unit and channels within said system to establish a logical connection with one of said channels;

presenting the the address of said device to said one channel;

locating an entry in a device table corresponding to the device address presented by said control unit;

locating an entry in said device table corresponding to the control unit attached to said device;

extracting a channel control block (CCB) from a device queue origin designated by a pointer corresponding to said control unit address; and placing said CCB at the top of the device queue to thereby allow resumption of the operation;

whereby no attempt need be made by a channel to locate an alternate path to a device when a control unit responds to the channel that is busy; if another path to the device exists which involves a free channel and a non-busy control unit that control unit automatically acquires the free channel.

45. The method according to claim 44 comprising the further step of maintaining a logical connection with a busy control unit until the CCB has been placed in the control unit queue and the queue has been unlocked whereby said alternate control unit acquires a channel only after the busy control unit has been deselected.

46. In a data processing system comprising a CPU, a memory, and a plurality of input/output channels, a method of interruption comprising:

storing an interruption queue comprising a fixed length table preceded by a control word in said memory;

comparing the priority of a CPU task with the priority of a task currently being executed by said channel in response to an interrupt;

denying said interrupt to said channel upon the condition that a higher priority task is stored in said CPU;

entering said task into said interruption queue; and interrogating said queue upon completion of said higher priority task to thereby process the interruption placed therein by said channel.

47. In an input/output system comprising a memory, a CPU, I/O devices and a plurality of channels, only certain ones of said channels electrically connected to devices in said system, and in which input/output channels programs are selected for operation by channels from a list of tasks in a work queue common to all of said channels, the method of insuring that only channels having access to devices involved in said operations select a corresponding task for execution comprising the steps of:

arranging the origins of channel queues, one queue defined for each maximum set of channels which have access to the same set of devices, and said work queue in a table at a fixed location in said memory;

providing a channel queue control word for maintaining an inventory of the contents of said channel queues, the value of the bits in said queue control word indicating whether the corresponding channel queues are empty or contain channel program tasks to be performed by one of said plurality of channels; a one in the nth channel queue consists of a chain of said tasks and a zero in said position signifying that the *n*th queue is empty;

setting the corresponding bit of the queue control word to a first state upon the condition that a task is placed into a empty channel queue;

setting the corresponding bit of the queue control word to a second state upon the extraction of a task from said queue; and setting a predetermined bit of said queue control word to a first state when a task is added to the channel work queue.

48. The method according to claim 47 further including the steps of:

constructing a list of channel mask words for describing the relationship between the channels and the channel queues defined for said channels, one channel mask word associated with each channel, the bits in said mask word set to indicate whether the corresponding channel queues are of significance to said channel, a one in the nth bit of a mask word signifying that the nth channel queue is related to the channel to which said mask word pertains.

49. The method according to claim 48 further including the steps of:

setting one of said bits of each said channel mask word to signify that said work queue is associated with all the channels; and logically removing a channel from said system by clearing its mask word.

50. The method according to claim 48 further including the step of:

determining, in response to a channel command requiring the establishing of a logical connection with a device, if said device is accessible to said channel by examining the bit of the mask word of said channel associated with the channel queue corresponding to said device.

51. The method according to claim 50 further including the steps of:

transferring said channel program to another channel by adding the channel control block to the channel queue corresponding to said device upon the condition that said bit in said channel mask word corresponding to said channel queue is zero; and signalling the channels associated with said queue upon the condition that said queue was empty before this operation.

52. The method according to claim 51 further including the steps of:

fetching both said channel mask word and said queue control word; and developing the bit-wise product of said channel mask word and said queue control word, whereby the resultant one bits correspond to channel queues containing CCBs relating both to devices accessible to the channel and to channel programs suspended within said enqueue operation.

53. The method according to claim 52 further comprising the step of:

removing a CCB from the queue related to the least significant one bit of said bit-wise product whereby execution of the corresponding channel program is then assumed by said channel in accordance with a predetermined priority which thereby gives priority to tasks which have been partially executed.

54. The method of controlling an input/output system said system including a memory in which a dependent argument table is stored, said table containing a class code, block number and parameters defining a device queue and the data sought, and in which a channel control block (CCB) is stored which is initialized to contain a buffer address, a string length and a pointer to an independent argument table comprising:

selecting an I/O task from a queue of tasks;

performing the task, which is in the form of an I/O program, up to a point where a controlled I/O device involved in the task does not need direct control for a relatively long period of time, executing a first enqueue command which command presents the logical address of the first byte of the desired string of data, resolving independent and dependent arguments of said enqueue command to locate an entry in a dependent argument table including the step of establishing the validity of operands and locating a corresponding dependent argument table;

resolving a dependent argument including a sequence loop in which the segment of the data set containing the first byte of the desired string of data is determined;

determining the maximum number of blocks which may be read or written following the execution of said enqueue command;

decoding the class code of a current entry in said dependent argument table;
enqueuing a channel control block onto a device queue using parameters found in said table;
selecting said device;
suspending said channel program;
selecting another task from the task queue and executing the I/O program associated with the new task;
monitoring the I/O device for a signal generated by the device when it reaches a point where it needs direct control; and
fetching said channel control block corresponding to the partially performed task previously stored in the device queue to thereby resume the previously suspended I/O program.

* * * * *